(12) United States Patent
Bouazizi et al.

(10) Patent No.: US 12,495,081 B2
(45) Date of Patent: Dec. 9, 2025

(54) METHOD AND APPARATUS FOR A SECURE APPLICATION SERVER

(71) Applicant: QUALCOMM Incorporated, San Diego, CA (US)

(72) Inventors: Imed Bouazizi, Frisco, TX (US); Carlos Marcelo Dias Pazos, Carlsbad, CA (US); Liangping Ma, San Diego, CA (US); Yong He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/447,633

(22) Filed: Aug. 10, 2023

(65) Prior Publication Data
US 2024/0056489 A1    Feb. 15, 2024

Related U.S. Application Data

(60) Provisional application No. 63/371,146, filed on Aug. 11, 2022.

(51) Int. Cl.
*G06F 13/00* (2006.01)
*H04L 9/40* (2022.01)
*H04L 65/1069* (2022.01)
*H04L 65/65* (2022.01)

(52) U.S. Cl.
CPC ........ *H04L 65/1069* (2013.01); *H04L 63/123* (2013.01); *H04L 65/65* (2022.05)

(58) Field of Classification Search
CPC ... H04L 65/1069; H04L 63/123; H04L 65/65; H04L 65/1104

USPC .................................................. 709/227–229
See application file for complete search history.

(56) References Cited

U.S. PATENT DOCUMENTS

| | | | |
|---|---|---|---|
| 10,587,502 B2 * | 3/2020 | Sharma | H04L 41/12 |
| 10,938,711 B2 * | 3/2021 | Sharma | H04L 45/38 |
| 11,017,183 B2 * | 5/2021 | Iyer | H04L 51/046 |
| 11,374,999 B2 * | 6/2022 | Håkansson | H04L 67/53 |
| 2015/0271273 A1 * | 9/2015 | Glass | H04L 67/141 |
| | | | 709/227 |
| 2018/0337849 A1 * | 11/2018 | Sharma | H04L 65/1069 |
| 2020/0036703 A1 * | 1/2020 | Håkansson | H04L 63/0876 |

(Continued)

OTHER PUBLICATIONS

International Search Report and Written Opinion—PCT/US2023/030036—ISA/EPO—Dec. 12, 2023. 13 pages.

*Primary Examiner* — Kenneth R Coulter
(74) *Attorney, Agent, or Firm* — Polsinelli LLP

(57) ABSTRACT

Various embodiments include systems and methods for supporting communication session establishment (e.g., Web Real-Time Communication (WebRTC) session establishment) between endpoint computing devices. Various embodiments include systems and methods that may provide for a server (e.g., a Simple WebRTC Application Protocol (SWAP) server acting as a WebRTC signaling server) that protects message privacy and integrity between endpoint computing devices by acting as a rendezvous point for applications and services. Various embodiments include systems and methods defining a simple, secure, and extensible signaling protocol that may allow a receiving party to determine and control other parties that may connect to the receiving party via communication session (e.g., a WebRTC session).

34 Claims, 16 Drawing Sheets

(56) References Cited

U.S. PATENT DOCUMENTS

2020/0213221 A1\* 7/2020 Sharma ................. H04L 41/122
2020/0327199 A1\* 10/2020 Iyer ......................... G06F 40/58
2020/0412770 A1 12/2020 Zhang et al.

\* cited by examiner

METHOD AND APPARATUS FOR A SECURE APPLICATION SERVER

RELATED APPLICATIONS

This application claims the benefit of priority to U.S. Provisional Application No. 63/371,146 entitled "Method And Apparatus For A Secure Web Real-Time Communication (WebRTC) Application Server" filed Aug. 11, 2022, the entire contents of which are hereby incorporated by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include systems and methods for supporting session establishment between endpoint computing devices. Various aspects include systems and methods that may provide for a server acting as a signaling server that protects message privacy and integrity between endpoint computing devices by acting as a rendezvous point for applications and services. Various aspects include systems and methods defining a simple, secure, and signaling protocol that may allow a receiving party to determine and control other parties that may connect to the receiving party.

Some aspects include methods performed by a processor of a server for supporting establishment of a communication session (e.g., a Web Real-Time Communication (WebRTC) session establishment), including: receiving a session request from a first endpoint computing device including matching criteria for a second endpoint computing device; determining whether the matching criteria in the session request matches matching criteria associated with the second endpoint computing device; and forwarding the session request to the second endpoint computing device in response to determining that the matching criteria in the session request does match matching criteria associated with a second endpoint computing device. In some aspects the session request may be a Web Real Time Communication (WebRTC) session request, and the server may be a Simple WebRTC Application Protocol (SWAP) server.

Some aspects may further include: receiving a response message with an acceptance from the second endpoint computing device in response to the session request; and forwarding the response message with the acceptance from the second endpoint computing device to the first endpoint computing device.

Some aspects may further include, prior to forwarding the session request: determining whether the session request is verified in response to determining that the matching criteria in the session request does match matching criteria associated with a second endpoint computing device, in which forwarding the session request to the second endpoint computing device in response to determining that the matching criteria in the session request does match matching criteria associated with a second endpoint computing device includes forwarding the session request to the second endpoint computing device in response to determining that the matching criteria in the session request does match matching criteria associated with a second endpoint computing device and the session request is verified. In some aspects, the communication session may be a WebRTC session, the session request may be a WebRTC session request, and the server may be a SWAP server.

Further aspects include methods performed by a processor of a first endpoint computing device for supporting communication session establishment (e.g., WebRTC session establishment), including sending a session request to a server including matching criteria for a second endpoint computing device, receiving a response message from the server with an acceptance from the second endpoint computing device, and establishing a session with the second endpoint computing device.

Some aspects may further include determining whether the response message is verified prior to establishing the session with the second endpoint computing device, in which establishing the session with the second endpoint computing device includes establishing the session with the second endpoint computing device in response to determining that the response message is verified. Some aspects may further include receiving the matching criteria for the second endpoint computing device from an application provider server. In some aspects, the communication session may be a WebRTC session, the session request may be a WebRTC session request, and the server may be a SWAP server.

In some aspects, the first endpoint computing device may be a user equipment computing device and the second endpoint computing device may be a user equipment device or a server. In some aspects, the first endpoint computing device may be a server and the second endpoint computing device may be a user equipment device or a server. In some aspects, the WebRTC session request may include a local session description protocol (SDP) and the response message may include a remote SDP.

Further aspects include methods performed by a processor of a receiving endpoint computing device for supporting communication session establishment (e.g., WebRTC session establishment). Such methods may include: receiving a session request forwarded from a server, the forwarded session request originated from an originating endpoint computing device; determining whether the session is accepted; sending a response to the server with an acceptance in response to determining that the WebRTC session is accepted; and establish a session with the originating endpoint computing device.

Some aspects may further include determining whether the session request is verified prior to determining whether the session is accepted, in which determining whether the session is accepted includes determining whether the session is accepted in response to determining that the session request is verified. In some aspects, the communication session may be a WebRTC session, the session request may be a WebRTC session request, and the server may be a SWAP server. In some aspects, the originating endpoint computing device may be a user equipment computing device and the receiving endpoint computing device may be a user equipment device or a server. In some aspects, the originating endpoint computing device may be a server and the receiving endpoint computing device is a user equipment device or a server. In some aspects, the forwarded WebRTC session request may include a local session description protocol (SDP) and the response message includes a remote SDP.

In some aspects, determining whether the session request is verified and/or determining whether the response message is verified may include verifying the session request and/or the response message using a shared secret of the session originated from an application provider server. In some aspects, the shared secret may be a shared token or shared secret key. In some aspects, the matching criteria include one or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
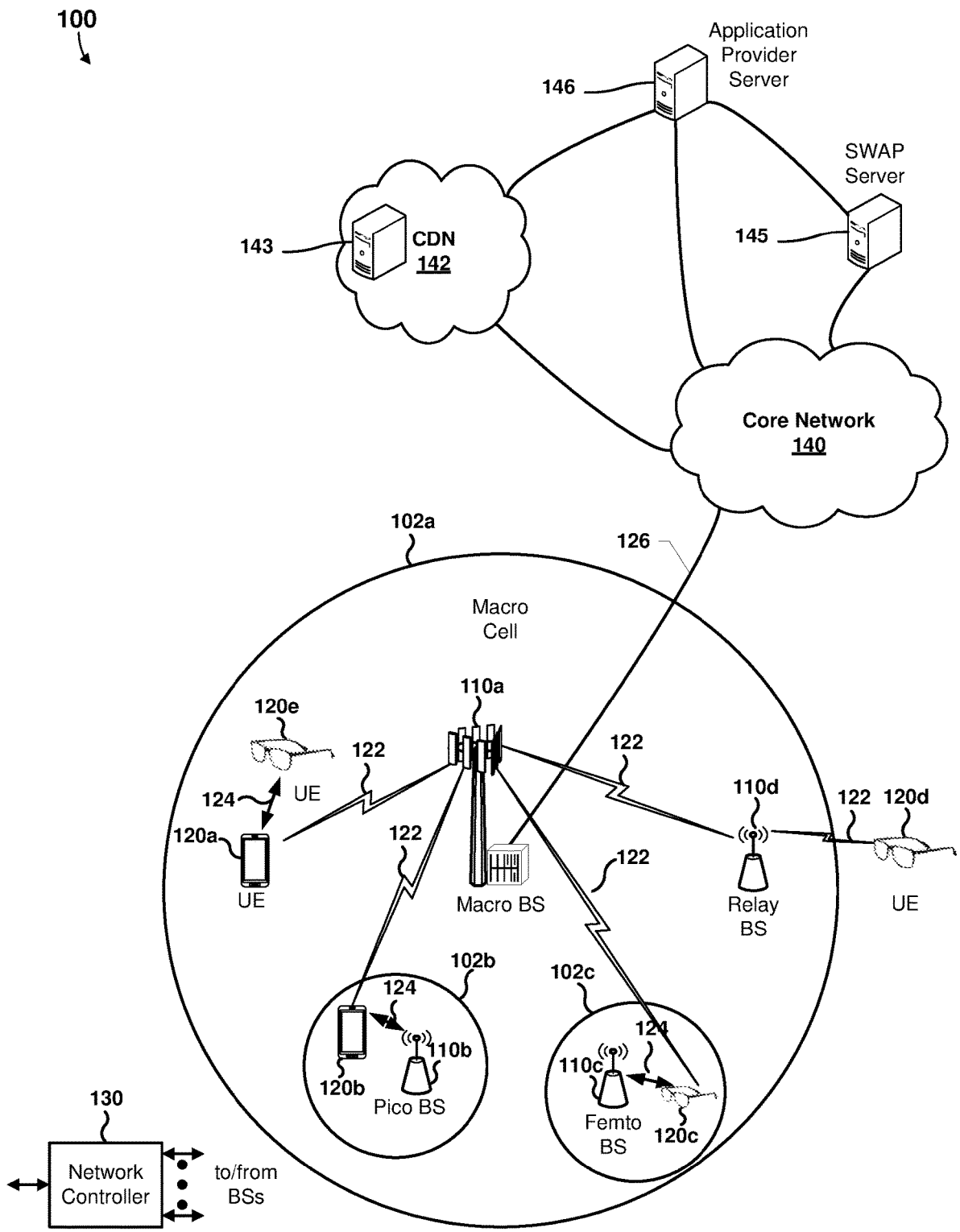
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide systems and methods for enabling clients and servers to establish connections to a server to function as a message relay that are secure and protect message privacy and integrity. Some embodiments may be implemented in a signaling server supporting WebRTC (Web Real-Time Communications), which is a protocol that enables real-time voice, text and video communications capabilities between computing devices. Various embodiments include providing an application provider (e.g., an application provider server or other network computing device) that authorizes matches between two parties by suppling a shared secret key of authentication and encryption and decryption of exchanged messages. Various embodiments may make use of a message authentication code with the shared secret to authenticate messages. A key derivation function may be used to derive the symmetric encryption decryption key. An application programming interface (API) may be used to perform the functions of various embodiments.

The terms "wireless device," "user equipment," and "UE" are used herein to refer to any one or all of endpoint or user devices, including wireless devices, wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, UEs affixed to or incorporated into various mobile platforms, global positioning system devices, and similar electronic devices that include a memory, wireless communication components and a programmable processor.

The phrase "head-mounted device" and the acronym (HMD) is used herein to refer to any electronic display system that is wearable and presents the user with at least some computer-generated imagery. HMDs may present just computer-generated imagery or a combination of computer-generated imagery and real-world images from a user's physical environment (i.e., what the user would see without the glasses). HMDs may enable the user to view the generated image in the context of the real-world scene. Non-limiting examples of head-mounted devices include, or may be included in, helmets, eyeglasses, virtual reality glasses, augmented reality glasses, electronic goggles, and other similar technologies/devices. A head-mounted device may include various hardware elements, such as a processor, a memory, a display, one or more cameras (e.g., world-view camera, gaze-view camera, etc.), and a wireless interface for connecting with the Internet, a network, or another computing device. In some embodiments, the head-mounted device processor may be configured to perform or execute an augmented reality software application.

In some embodiments a head-mounted device may be an accessory for and/or receive information from a wireless device (e.g., desktop, laptop, Smartphone, tablet computer, etc.), with all or portions of the processing being performed on the processor of that wireless device. As such, in various embodiments, the head-mounted device may be configured to perform all processing locally on the processor in the head-mounted device, offload all of the main processing to a processor in another computing device (e.g., a laptop present in the same room as the head-mounted device, etc.), or split the main processing operations between the processor in the head-mounted device and the processor in the other computing device. In some embodiments, the processor in the other computing device may be a server in "the cloud" with which the processor in the head-mounted device or in an associated wireless device communicates via a network connection (e.g., a cellular network connection to the Internet).

The term "radio resource" is used herein to refer to hardware, such as modems, radios, processors, transceivers, transmitters, receivers, timers, voltage regulators, oscillators, amplifiers, filters, antennas, circuits, encoders, decoders, etc., and/or software that operate individually, or in any combination, for sending and/or receiving electromagnetic radiation to provide wireless communication services, such as cellular and mobile communication services.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet switched (PS) services. Data services in LTE may be provided over the Internet, while multimedia services may be supported by the Internet Multimedia Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN).

One implementation option for advanced networks, such as 5G new radio (NR)(5GNR) networks, future generation system networks (e.g., sixth generation (6G) or higher networks), etc., being adopted is a 5G SA network in which a 5G radio access network (RAN) and 5G core network provide 5G services in geographic area, such as a country. As such, 5G SA networks can overlap coverage in the geographic area, such as the country, with LTE networks. 5G SA networks can exclusively include NR base stations, such as Next Generation NodeB (gNodeBs or gNBs).

Another implementation option for advanced systems or networks (e.g., 5G systems or networks, 6G systems or networks, higher generation systems or networks, etc.) currently being adopted is a 5G NSA network in which a RAN providing both LTE (also referred to as 4G) and new radio (NR) (also referred to a 5G) support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A wireless device, sometimes referred to as a user equipment (UE), in such 5G NSA networks that can support both LTE and NR communications can signal to the 5G NSA that the UE supports dual connectivity with new radio (DCNR).

Various embodiments may support a variety of communication systems, an example of which is Web Real-Time Communication (WebRTC), which is a protocol that supports devices conducting—real-time point-to-point communications. WebRTC leverages the Real-Time Transport Protocol (RTP) for the transmission of media between computing devices (referred to herein as endpoint devices). WebRTC enables the establishment of a WebRTC session between computing devices, such as between an endpoint wireless device (e.g., a mobile user equipment (UE), an HMD, and the like) and a server (e.g., a server of a content delivery network (CDN), gaming server, conferencing server, EDGE server, etc.), in which multiple streams may be supported for data transmission between the devices in the WebRTC sessions, such as multiple RTP streams multiplexed through a single IP address and port. In WebRTC the session setup protocol may be undefined, though several implementations rely session description protocol (SDP) signaling, to establish WebRTC sessions between devices. WebRTC may support point-to-point communication.

WebRTC may be utilized by real-time communication applications and/or services to establish connections to exchange different types of content or media. WebRTC may be used for media exchange between computing devices. Depending on the service or application type, a client device, such as a UE, may establish a WebRTC connection to another client device, such as another UE, or a server, such as an edge server. WebRTC may be used to support connections for exchanging content and/or media of various services, such as live video services, sport betting services, broadcast services, cloud based game streaming services, on-line gaming spectator mode services, in-stadium interactive services, extended reality (XR) services, augmented reality (AR) telephony services, split rendering services, etc.

Some embodiments may support WebRTC session establishment between endpoint computing devices, such as mobile UEs, HMD, etc. on one end of a communication session and a server of a CDN, gaming server, conferencing server, EDGE server, etc. on the other end of the communication session. Some embodiments may include a Simple WebRTC Application Protocol (SWAP) server acting as a WebRTC signaling server that protects message privacy and integrity between endpoint computing devices by acting as a rendezvous point for WebRTC applications and services. A SWAP server may enable WebRTC applications running on UEs and servers to establish connections with one another. The communications between the WebRTC endpoints and the SWAP server may secure communications. Some embodiments may define a simple, secure, and extensible WebRTC signaling protocol that may allow a receiving party to determine and control other parties that may connect to the receiving party. Some embodiments may enable a receiving party to select to have a SWAP server perform filtering of connection requests based on matching criteria and an authorization procedure. Non-limiting examples of matching criteria include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens.

Some embodiments may include a SWAP server that enables application-specific matching between endpoint computing devices attempting to establish a WebRTC session with one another to exchange content for a service. Various embodiments may include flexible matching that may defined based on one or more matching rules set by endpoint computing devices and/or application providers. Some embodiments may include secure matching based on encrypted messaging that may avoid security issues, such as distributed denial of service (DDoS) attacks, man-in-the-middle attacks, etc., experienced in other session establishment protocols. Some embodiments may enable both parties to a potential WebRTC session to verify one another's identity before establishing the WebRTC session. Some embodiments may support exchange of protected messages, such as session setup messages and/or application specific messages. Some embodiments may support web based data exchange formats, such as JavaScript Object Notation (JSON), etc.

Various embodiments may include an application provider authorizing matching between two endpoint computing devices, such as two UEs, a UE and a server, two servers, etc., by supplying a shared secret key for a session to the two endpoint computing devices. The session key may be used for authentication and/or encryption/decryption of exchanged messages between the two endpoint computing devices. Various embodiments may include the use of a Message Authentication Code (MAC) with the shared secret to authenticate exchanged messages between the two endpoint computing devices. Various embodiments may include use of a key derivation function (KDF) to derive symmetric encryption/decryption keys for use by the two endpoint computing devices. For example, the Web Cryptography Application Programing Interface (API) (WebCrypto API) may be used to support the cryptographic functions for message encryption/decryption in some embodiments.

Various embodiments may include an endpoint computing device, such as a UE, HMD, a server, etc., being registered with a SWAP server. The registration of the endpoint computing device may supply the SWAP server with matching criteria by which the endpoint computing device may be located and/or identified. The SWAP server may act as a shield for the endpoint computing devices by screening connection requests for the endpoint computing devices based on the matching criteria. Only connection requests that are deemed as authorized by the SWAP server based on the matching criteria may be forwarded to the endpoint computing device. Matching criteria may be received on a per computing device basis and may be unique matching criteria for a given computing device.

As noted above, examples of matching criteria may include application identifiers, session tokens, endpoint IP addresses, edge application server IDs, geographical location indications, resource availability indications, application defined endpoint identifiers and/or addresses, application required capabilities, and/or secure tokens. When multiple matching criteria are provided, matching criteria rules may be defined that govern how the matching criteria may be combined to verify a match. For example, the rules may be logical operators, such as AND, OR, XOR operators defining how multiple matching criteria may be combined to result in a match.

Various embodiments may include an originating endpoint computing device, such as a UE, a server, etc., sending a session request (e.g., a WebRTC session request) to a server (e.g., a SWAP server) to establish a session (e.g., a WebRTC session) with a second endpoint computing device, such as another UE, another server, etc. The session request may indicate one or more matching criteria of the second endpoint computing device. The one or more matching criteria may be matching criteria of that second endpoint computing device provided to the originating endpoint computing device by an application provider.

The application provider may be providing a service to the originating endpoint computing device and the second endpoint computing device for which a communication session (e.g., a WebRTC session) may be established between the two endpoint computing devices (e.g., a UE or HMD and a server). The application provider may provide a shared secret, such as a session token, session key, etc., to the originating endpoint computing device and the second endpoint computing device for use in validating that session (e.g., WebRTC session). The session request (e.g., WebRTC session request) may include the shared secret for the session. The session request may include a local session description protocol (SDP).

Various embodiments may include the server (e.g., a SWAP server) receiving a session request (e.g., a WebRTC session request) from the originating endpoint computing device, such as a UE, a server, etc., and determining whether the supplied matching criteria in the session request matches matching criteria of a second endpoint computing device, such as another UE, another server, etc. A match between the matching criteria may indicate the originating endpoint computing device is authorized to send connection requests (e.g., WebRTC connection requests) to the second endpoint computing device.

In response to determining that the originating endpoint computing device is authorized to send connection requests (e.g., WebRTC connection requests) to the second endpoint computing device, the server (e.g., SWAP server) may forward the session request (e.g., WebRTC session request) to the second endpoint computing device. The second endpoint computing device may decrypt and/or verify the message integrity/authenticity of the session request (e.g., WebRTC session request) and respond to the server (e.g., SWAP server), for example with an accept message including a SDP answer and/or remote SDP. The server (e.g., SWAP server) may forward the response from the second endpoint computing device to the originating endpoint computing device. The originating endpoint computing device may decrypt and/or verify the message integrity/authenticity of the response and establish the session (e.g., WebRTC session) with the second endpoint computing device.

Various embodiments may include the second endpoint computing device offloading the message integrity/authenticity of the session request (e.g., WebRTC session request) to the server (e.g., SWAP server). In response to determining that the originating endpoint computing device is authorized to send connection requests (e.g., WebRTC connection requests) to the second endpoint computing device, the server (e.g., SWAP server) may decrypt and/or verify the message integrity/authenticity of the connection request (e.g., WebRTC session request). The server (e.g., SWAP server) may only forward successfully decrypted and/or verified messages to the second endpoint computing device.

Various embodiments may include protocol messages that may be sent to servers (e.g., SWAP servers) from endpoint computing devices and/or sent from endpoint computing devices to servers (e.g., SWAP servers) to support session (e.g., WebRTC session) provisioning between endpoint computing devices. Matching criteria may be sent to the server (e.g., SWAP server) via a registration message, for example a protocol message with a message field indicated as "register."

The registration message may register the second endpoint computing device as an endpoint with the server (e.g., SWAP server). The registration message may include matching criteria as matching parameters. Successful registration may be indicated by the server (e.g., SWAP server) with an acknowledge message, for example a protocol message with a message field indicated as "ack". An error in registration may be indicated by the server (e.g., SWAP server) with an error message, for example a protocol message with a message field indicated as "error."

A session request (e.g., WebRTC session request) may identify the second endpoint computing device. The session request (e.g., WebRTC session request) may include one or more matching criteria of the second endpoint computing device. The session request (e.g., WebRTC session request) may include a session description protocol (SDP) offer. As an example, the session request (e.g., WebRTC session request) may be a protocol message with a message field indicated as "connect". As an example, the rejection message may be a protocol message with a message field indicated as "reject". As an example, the accept message may be a protocol message with a message field indicated as "accept". The accept message may signal to the requesting endpoint computing device, for example the originating endpoint computing device that the second endpoint computing device has accepted the session request (e.g., WebRTC session request). As an example, the reject message may be a protocol message with a message field indicated as "reject". The close message may be a protocol message with a message field indicated as "close".

As another example, an application message may be sent via the server (e.g., SWAP server) that may be an application specific message defined by the application and/or the application provider. The application message may be a protocol message with a message field indicated as "application". As another example, an updated message may be sent via the server (e.g., SWAP server) that may be a request from one endpoint to another endpoint to update the session (e.g., WebRTC session). The update message may be a protocol message with a message field indicated as "update".

Various embodiments improve the operations and efficiencies of communication networks, improve the user experience of some applications and services, and improve security in WebRTC session establishment. Servers (e.g., SWAP servers) acting as shields and/or rendezvous points for remote endpoint computing devices may enable endpoint computing devices to control connection requests. Servers (e.g., SWAP servers) acting as shields and/or rendezvous points for remote endpoint computing devices may prevent erroneous connection requests from being sent to the wrong endpoints. Servers (e.g., SWAP servers) acting as shields and/or rendezvous points for remote endpoint computing devices may reduce malicious attacks on endpoint computing devices, such as DDoS attacks, man-in-the-middle attacks, etc. Servers (e.g., SWAP servers) acting as shields and/or rendezvous points for remote endpoint computing devices may benefit various services leveraging Dynamic Adaptive Streaming of HTTP (DASH) content delivery to end users, such as sport betting services, broadcast services, cloud based game streaming services, on-line gaming spectator mode services, in-stadium interactive services, etc.

Various embodiments are described below using the example of WebRTC protocols and server functions. While various embodiments have particular application to WebRTC, embodiments are applicable to other communication protocols. Therefore, references to WebRTC protocols and terminology are intended as an example of a possible implementation and not intended to limit the scope of the claims unless WebRTC terminology is recited in the claims.

FIG. 1A is a system block diagram illustrating an example communications system 100. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1A). The communications system 100 also may include various network devices, such as various servers 143 of a content delivery network (CDN) 142, various servers 146 of an application provider, a Simple WebRTC Application Protocol (SWAP) server 145, etc. The communications system 100 also may include a number of base stations (illustrated as the BS 110a, the BS 110b, the BS 110c, and the BS 110d) and other network entities. A base station is an entity that communicates with UEs, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with a service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The UEs 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a UE) and send a transmission of the data to a downstream station (for example, a UE or a base station). A relay station also may be a wireless device (e.g., a UE) that can relay transmissions for other UEs. In the example illustrated in FIG. 1A, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout the communications system 100, and each UE may be stationary or mobile. A UE also may be referred to as an access terminal, a terminal, a mobile station, a subscriber unit, a station, wireless device, etc.

A macro base station 110a may communicate with the communication network 140 over a wired or wireless communication link 126. The UEs 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more UEs (for example, illustrated as the UE 120*a* and the UE 120*e*) may communicate directly using one or more sidelink channels (for example, without using a base station 110*a-d* as an intermediary to communicate with one another). For example, the UEs 120*a*-120*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120*a*-120*e* may perform scheduling operations, resource selection operations, as well as other operations described elsewhere herein as being performed by the base station 110*a*-110*d*.

In some implementations, the CDN 142 may provide content, such as media content (e.g., augmented reality (AR) telephony content, gaming content, extended reality (XR) content, video content, etc.), to one or more of the UEs 120*a*-120*e*. The content may be delivered from one or more servers 143 of the CDN 142 to the UEs 120*a*-120*e* via the core network 140 and connections 122, 126. The one or more servers 143 of the CDN 142 may be node servers. A server 143 of the CDN 142 originating the content and providing it to other servers 143 of the CDN 142 may be referred to as a source server. The content may be delivered using various protocols, such as WebRTC, etc. As one example, a WebRTC session may be established between the originating (or source endpoint) server 143 of the CDN 143 and the destination (or receiving endpoint) UE 120*a*-120*e*. The server 143 of the CDN 142 providing the content to the core network 140 may be referred to as an edge node server of the CDN 142. A UE 120*a*-120*e* receiving content from the CDN 142 may be an endpoint computing device. As examples, the CDN 142 may support delivery of media content to endpoint computing devices (e.g., UE 120*a*-120*e*) thereby provisioning various services to the endpoint computing devices, such as live video services, sport betting services, broadcast services, cloud based game streaming services, on-line gaming spectator mode services, in-stadium interactive services, XR services, AR telephony services, split rendering services, etc.

In some implementations, one UE 120*a*-120*e* may provide content, such as media content (e.g., augmented reality (AR) telephony content, gaming content, extended reality (XR) content, video content, etc.), to another one of the UEs 120*a*-120*e*. The content may be delivered from an originating one of the UEs 120*a*-120*e* acting as a source server to a receiving one of the UEs 120*a*-120*e* acting as an endpoint computing device via the core network 140 and connections 122, 124. The content may be delivered using various protocols, such as WebRTC, etc. As one example, a WebRTC session may be established between the originating (or source endpoint) UE 120*a*-120*e* and the destination (or receiving endpoint) UE 120*a*-120*e* to exchange content. As examples, exchange of content between the originating (or source endpoint) UE 120*a*-120*e* and the destination (or receiving endpoint) UE 120*a*-120*e*, such as via a WebRTC session, may support delivery of media content between endpoint computing devices (e.g., UE 120*a*-120*e*) thereby provisioning various services between the endpoint computing devices (e.g., UE 120*a*-120*e*), such as live video services, XR services, AR telephony services, etc.

In some implementations, the application provider server 146 may be a server of an application provider that provides services to the UEs 120*a*-120*e*, such as live video services, sport betting services, broadcast services, cloud based game streaming services, on-line gaming spectator mode services, in-stadium interactive services, XR services, AR telephony services, split rendering services, etc. The application provider server 146 may perform operations to support provisioning a service to UEs 120*a*-120*e*, such as operations to register devices for utilizing a service, such as UEs 120*a*-120*e*, provide authentication support for devices utilizing a service, such as UEs 120*a*-120*e*, define service requirements, provide content for services to a CDN 142, etc. In some implementations, the application provider server 146 may define matching criteria by which computing devices, such as UEs 120*a*-120*e*, server 143, etc., may be identified as associated with a service. The application provider server 146 may provide matching criteria to the Simple WebRTC Application Protocol (SWAP) server 145. The matching criteria may enable application-specific matching between endpoint computing devices attempting to establish a WebRTC session with one another to exchange content for a service. In some implementations, the application provider server 146 may establish cryptographic elements (e.g., secure tokens, secret keys, authentication codes, etc.) for endpoint computing devices, such as UEs 120*a*-120*e*, server 143, etc., to be used to establish connections associated with a service, such as a WebRTC session between any two endpoint computing devices, such as any two of UEs 120*a*-120*e* and server 143. The application provider server 146 may provide cryptographic elements (e.g., secure tokens, secret keys, authentication codes, etc.) to the SWAP server 145 and/or endpoint computing devices, such as UEs 120*a*-120*e*, server 143.

In some implementations, the Simple WebRTC Application Protocol (SWAP) server 145 may be a server that acts as a rendezvous point and/or message relay for two computing devices, such as UEs 120*a*-120*e*, server 143, etc., attempting to establish WebRTC connections to one another. In some implementations, the SWAP server 145 may store matching criteria associated with computing devices, such as UEs 120*a*-120*e*, server 143, etc. The matching criteria may be received from application provider server 146 and/or another computing device, such as UEs 120*a*-120*e*, server 143, etc., defining its own respective matching criteria. The matching criteria may enable application-specific matching between endpoint computing devices attempting to establish a WebRTC session with one another to exchange content for a service. Matching criteria may be received on a per computing device basis and may be unique matching criteria for a given computing device. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. When multiple matching criteria are provided, matching criteria rules may be defined that govern how the matching criteria may be combined to verify a match. For example, the rules may be logical operators, such as AND, OR, XOR operators defining how multiple matching criteria may be combined to result in a match.

In some implementations, the SWAP server 145 may act as a shield for one remote party, such as UEs 120a-120e, server 143, etc., that is being contacted by another remote party, such as UEs 120a-120e, server 143, etc. The SWAP server 145 may receive a request to match with a selected endpoint computing device, such as UEs 120a-120e, server 143, etc., from a requesting endpoint computing device, such as UEs 120a-120e, server 143, etc. The requesting endpoint computing device, such as UEs 120a-120e, server 143, etc., may send a request to the SWAP server 145 with an indication of one or more matching criteria for the selected endpoint computing device, such as UEs 120a-120e, server 143, etc. The SWAP server 145 may compare the received matching criteria in the request to the matching criteria available to the SWAP server 145.

A successful match between the received matching criteria and matching criteria associated with the selected endpoint computing device, such as UEs 120a-120e, server 143, etc., may indicate the requesting endpoint computing device, such as UEs 120a-120e, server 143, etc., is authorized to communicate with the selected endpoint computing device, such as UEs 120a-120e, server 143, etc., and the SWAP server 145, may forward the request to the selected endpoint computing device, such as UEs 120a-120e, server 143, etc.

An unsuccessful match between the received matching criteria and the matching criteria associated with the selected endpoint computing device, such as UEs 120a-120e, server 143, etc., may indicated the requesting endpoint computing device, such as UEs 120a-120e, server 143, etc., is not authorized to communicate with the selected endpoint computing device, such as UEs 120a-120e, server 143, etc., and the SWAP server 145 may reject the connection request and not forward the request to the selected endpoint computing device, such as UEs 120a-120e, server 143, etc.

Figure 1B:
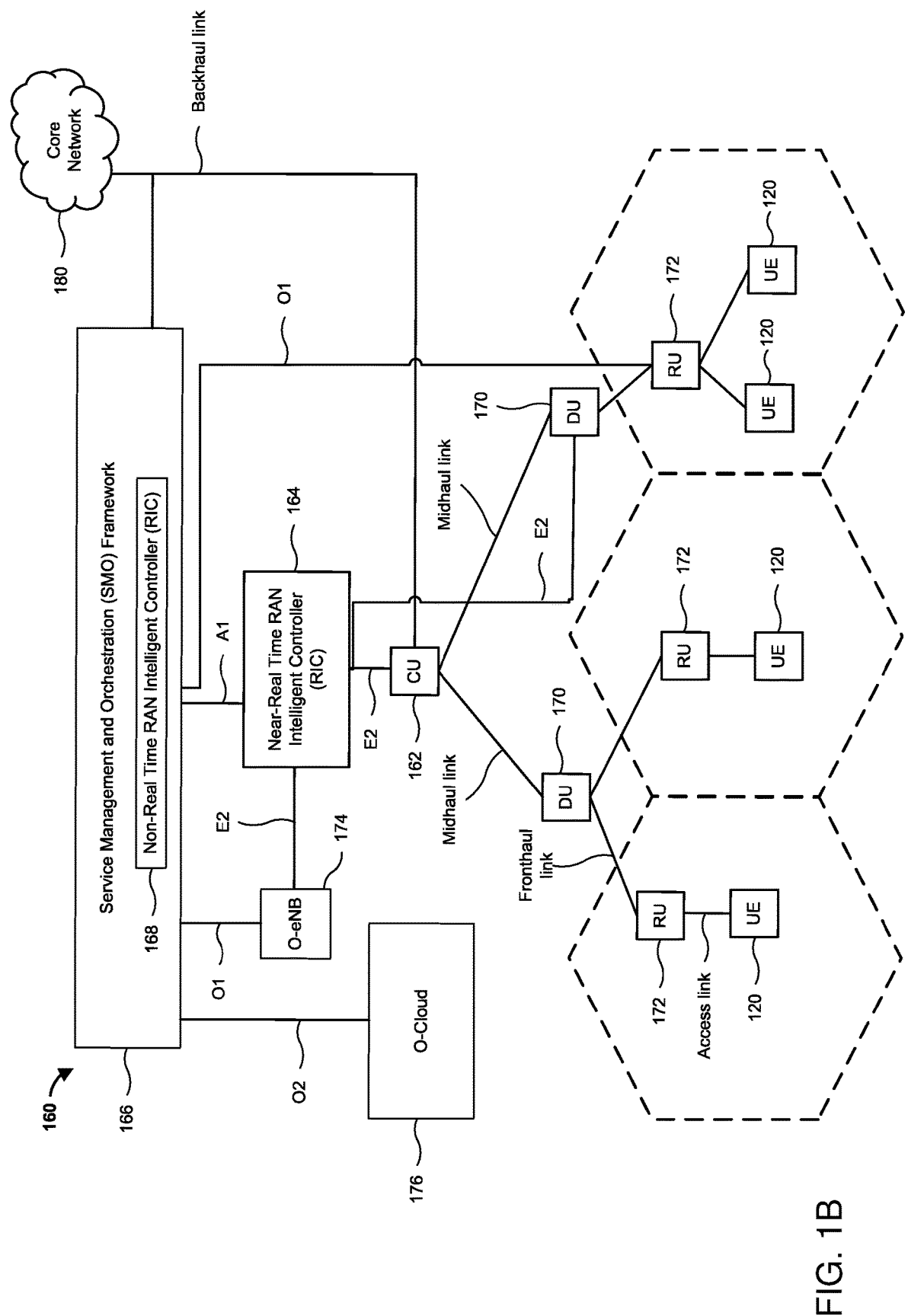
FIG. 1B is a system block diagram illustrating an example disaggregated base station architecture for wireless communication systems suitable for implementing any of the various embodiments.

FIG. 1B is a system block diagram illustrating an example disaggregated base station 160 architecture that may be part of communications system (e.g., communications system 100), such as a 5G (or later generation) network, suitable for implementing any of various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, UEs may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
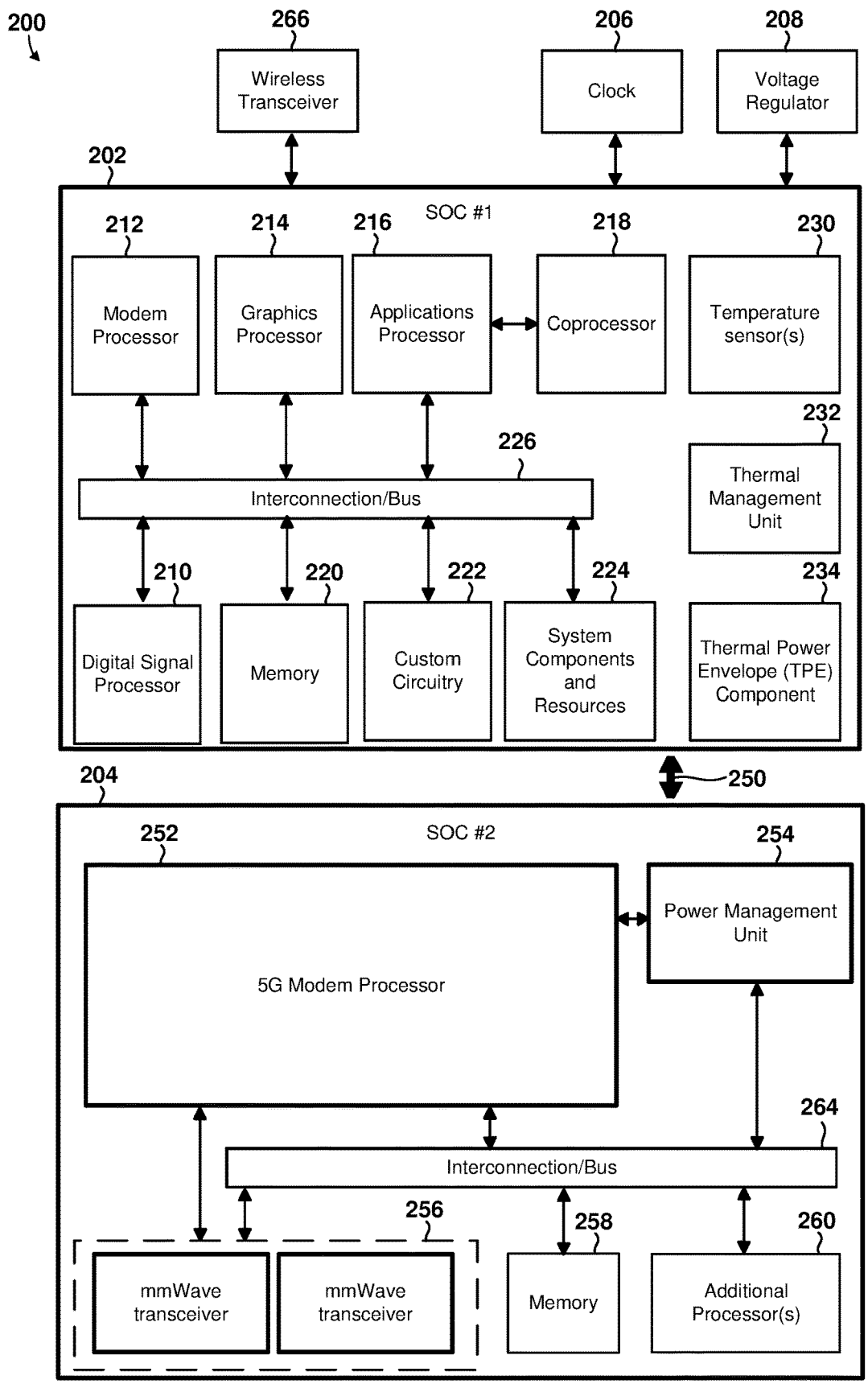
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from UEs, such as a base station 110a. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
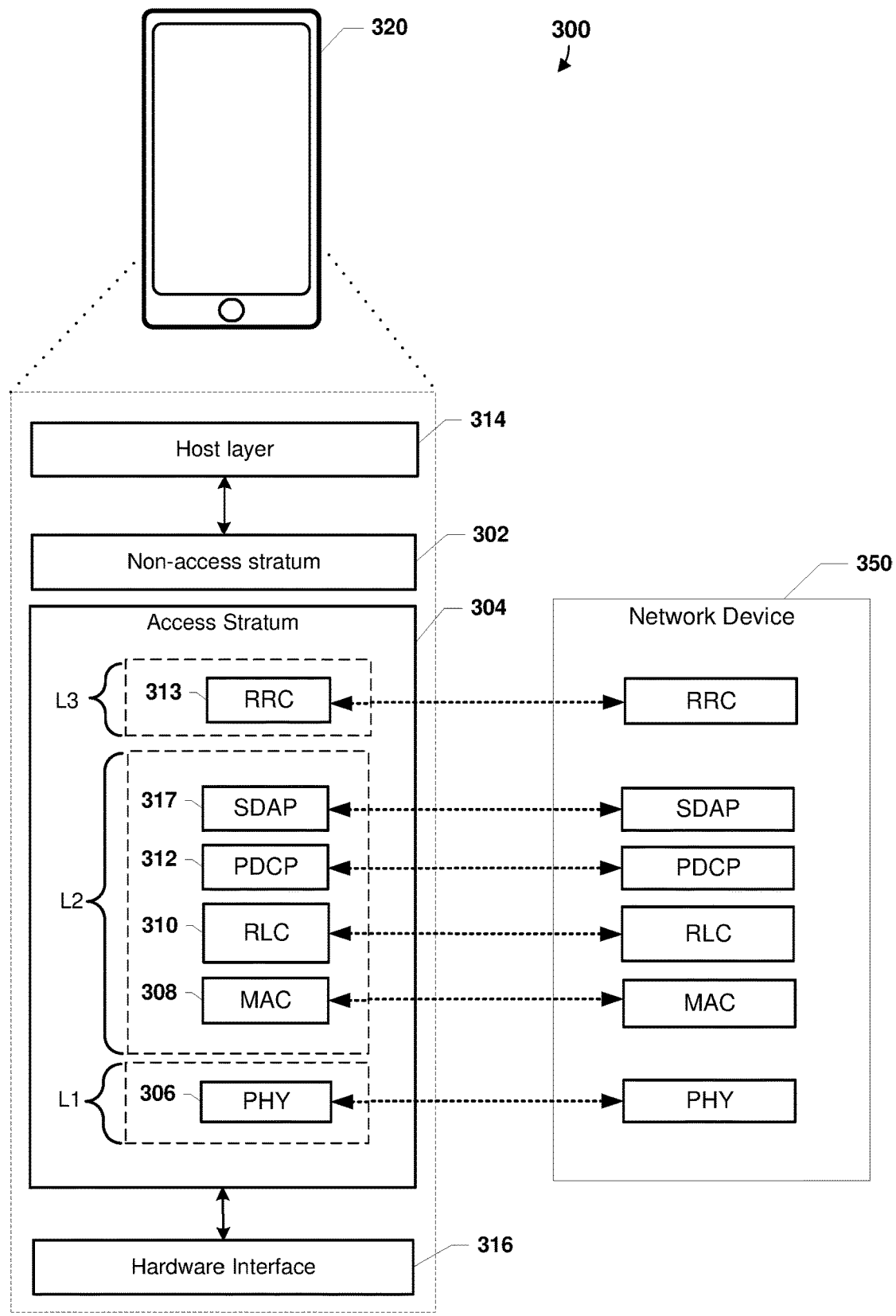
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1A-3, the UE 320 may implement the software architecture 300 to facilitate communication between a UE 320 (e.g., the UE 120a-120e, 200) and a network device 350 (e.g., network device 143, 145, 146) of a communication system (e.g., 100). In various embodiments, layers in software architecture 300 may form logical connections with corresponding layers in software of the network device 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different subscriber identity module (SIM) (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network device 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer each of which form logical connections terminating at the network device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network device 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
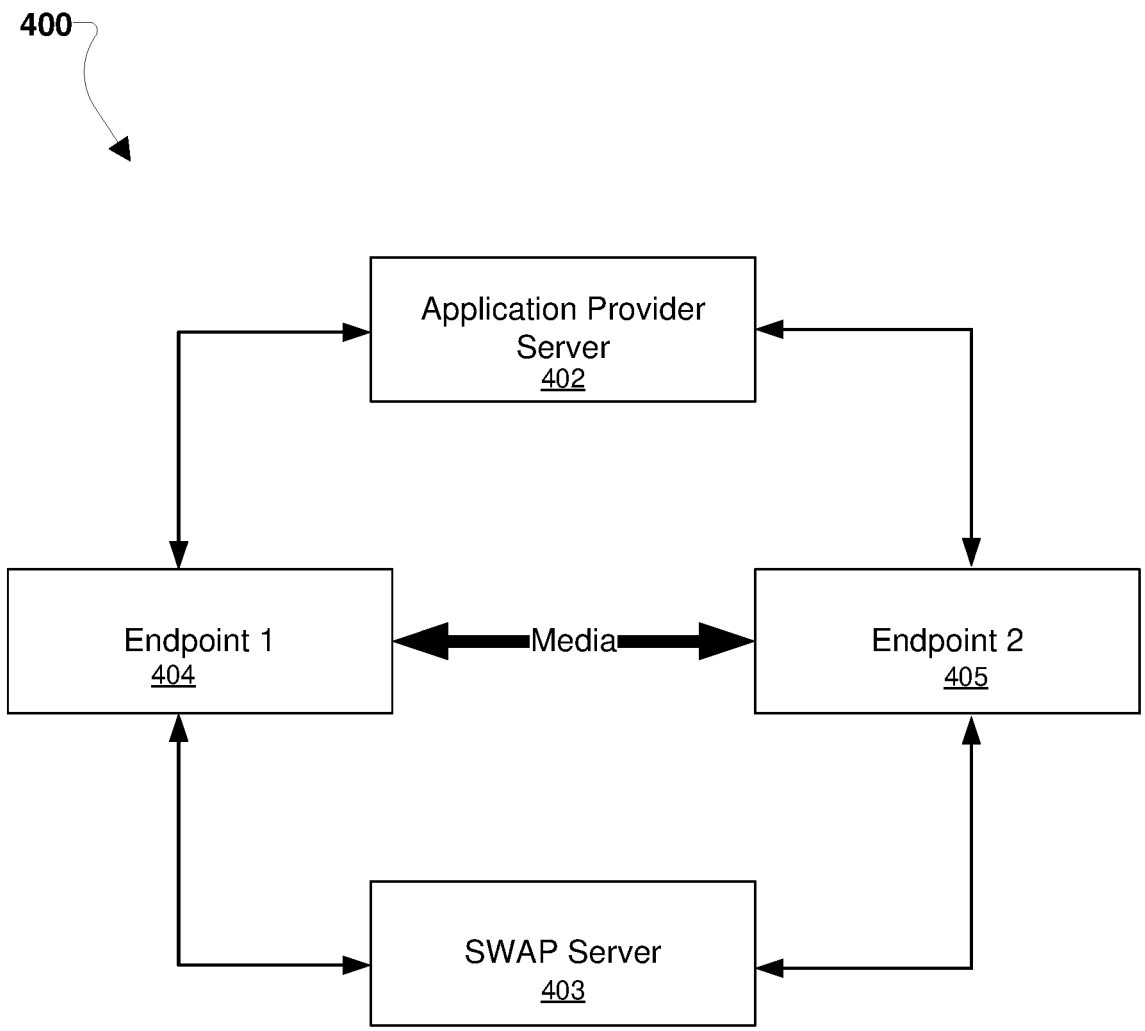
FIG. 4 is a block diagram illustrating example interactions in a system to support Web Real-Time Communication (WebRTC) session establishment between endpoints in accordance with various embodiments.

FIG. 4 is a block diagram illustrating example interactions in a system (e.g., 100) to support Web Real-Time Communication (WebRTC) session establishment between endpoint computing devices (e.g., UEs 120, 120a-120e, 200, 320, network device 143, 350, etc.) in accordance with various embodiments. With reference to FIGS. 1A-4, a first endpoint computing device 404 (e.g., UEs 120, 120a-120e, 200, 320, network device 143, 350, etc.) and a second endpoint computing device 405 (e.g., UEs 120, 120a-120e, 200, 320, network device 143, 350, etc.) may be registered with an application provider server 402 (e.g., network device 146, 350, etc.) to receive a service associated with eh application provider server 402. The service may be any type service in which content, such as media, may be sent and/or received over a WebRTC connection, such as live video services, sport betting services, broadcast services, cloud based game streaming services, on-line gaming spectator mode services, in-stadium interactive services, XR services, AR telephony services, split rendering services, etc.

In some implementations, the content, such as media streams, of the service may be exchanged between the first endpoint computing device 404 and the second endpoint computing device 405 via a WebRTC session established between the first endpoint computing device 404 and the second endpoint computing device 405. For example, the first endpoint computing device 404 may be a first UE receiving media in a peer-to-peer streaming application from a second UE that is the second endpoint computing device 405 also using the peer-to-peer streaming application. The peer-to-peer streaming application may be provided to both endpoint computing devices 404, 405 by the application provider server 402 which may also establish session requirements and keys for the sharing of media between the endpoint computing devices 404, 405. As another example, the first endpoint computing device 404 may be a first UE receiving a spit rendering service from a an edge server that is the second endpoint computing device 405. The spit rendering service may be provided to the endpoint computing devices 404 as directed by the application provider server 402 which may designate the endpoint computing device 405 as the edge node server from which to receive the split rendering services and the application also establish session requirements and keys for the rendering offloaded to the second endpoint computing device 405 by the first endpoint computing device 404. Peer-to-peer streaming and split rendering services are merely two examples of services for which the system 400 may support WebRTC session establishment between endpoint computing devices 404 and 405, and the operations of the system may be used to establish sessions for any type service or application using WebRTC connections between endpoint computing devices 404, 405.

In some implementations, the application provider server 402 may provide matching criteria for the second endpoint computing device 405 to the first endpoint computing device 404. In some implementations, the application provider server 402 may provide the matching criteria for the second endpoint computing device 405 to the SWAP server 403. In some implementations, the second endpoint computing deice 405 may provide its own respective matching criteria to the SWAP server 403. Whether provided by the application provider server 402 and/or the second endpoint computing device 405, the matching criteria may enable application-specific matching between endpoint computing devices 404, 405 attempting to establish a WebRTC session with one another to exchange content for a service, such as media, via WebRTC connections. Matching criteria may be received on a per computing device basis and may be unique matching criteria for a given computing device. As such, the matching criteria for the second endpoint computing device 405 may uniquely identify the second endpoint computing device 405. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. When multiple matching criteria are provided, matching criteria rules may be defined that govern how the matching criteria may be combined to verify a match. For example, the rules may be logical operators, such as AND, OR, XOR operators defining how multiple matching criteria may be combined to result in a match.

In some implementations, matching criteria may be sent to the SWAP server 403 via a registration message, for example a protocol message with a message field indicated as "register". The registration message may register the second endpoint computing device 405 as an endpoint with the SWAP server 403. The registration message may include matching criteria as matching parameters. Successful registration may be indicated by the SWAP server 403 with an acknowledge message, for example a protocol message with a message field indicated as "ack". An error in registration may be indicated by the SWAP server 403 with an error message, for example a protocol message with a message field indicated as "error".

In some implementations, the first endpoint computing device 404 may send a WebRTC session request to the SWAP server 403 to request a WebRTC connection to the second endpoint computing device 404. The WebRTC session request may identify the second endpoint computing device 404. The WebRTC session request may include one or more matching criteria of the second endpoint computing device 404. The WebRTC session request may include a session description protocol (SDP) offer. As an example, the WebRTC session request may be a protocol message with a message field indicated as "connect".

In some implementations, the SWAP server 403 may compare any matching criteria in the WebRTC session request received from the first endpoint computing device 404 to matching criteria associated with the second endpoint computing device 405 in response to receiving the WebRTC session request from the first endpoint computing device 404.

In response to matching criteria in the WebRTC session request from the first endpoint computing device 404 matching the matching criteria of the second endpoint computing device 405 known to the SWAP server 403 (e.g., stored in a memory available to the SWAP server 403), the SWAP server 403 may forward the WebRTC session request to the second endpoint computing device 405. In some implementations, in addition to ensuring the matching criteria matches, the SWAP server 403 may also attempt to decrypt and/or verify message integrity and/or authenticity in response to matching criteria in the WebRTC session request from the first endpoint computing device 404 matching the matching criteria of the second endpoint computing device 405 known to the SWAP server 403 (e.g., stored in a memory available to the SWAP server 403). In response to decrypting and/or verifying the message integrity and/or authenticity, the SWAP server 403 may forward the WebRTC session request to the second endpoint computing device 405.

In response to matching criteria in the WebRTC session request from the first endpoint computing device 404 not matching the matching criteria of the second endpoint computing device 405 and/or in response to failing to decrypt and/or verify the message integrity and/or authenticity, the SWAP server 403 may send a rejection message to the first endpoint computing device 404. As an example, the rejection message may be a protocol message with a message field indicated as "reject". The sending of the rejection message to the first endpoint computing device 404 by the SWAP server 403 may prevent the second endpoint computing device 405 from being contacted by the first endpoint computing device 405 and the SWAP server when matching and/or decrypting and/or verifying fails. This prevention of message forwarding to the second endpoint computing device 405 by the SWAP server 403 when matching and/or decrypting and/or verifying fails may reduce erroneous messages and/or attack attempts on the second endpoint computing device 405.

In some implementations, the second endpoint computing device 405 may receive the forwarded WebRTC session request from the SWAP server 403. In some implementations, the second endpoint computing device 405 may attempt to decrypt and/or verify message integrity and/or authenticity in response to receiving the WebRTC session request. In some implementations, the second endpoint computing device 405 may send an accept message to the SWAP server 403 in response to receiving the WebRTC session request forwarded by the SWAP server 403. As an example, the accept message may be a protocol message with a message field indicated as "accept". The accept message may signal to the requesting endpoint computing device, for example the first endpoint computing device 404 that the second endpoint computing device 405 has accepted the WebRTC session request. The accept message may include an SDP answer and/or remote SDP. In some implementations, the second endpoint computing device 405 may send a reject message to the SWAP server 403 in response to receiving the WebRTC session request forwarded by the SWAP server 403. As an example, the reject message may be a protocol message with a message field indicated as "reject". The reject message may indicate the second endpoint computing device 405 is rejecting an offer and/or update of a WebRTC session.

In some implementations, the SWAP server 403 may receive the accept message or the reject message from the second endpoint computing device 405 and may forward the accept message or the reject message to the first endpoint computing device 404. In response to receiving a reject message, the first endpoint computing device 404 may not establish a WebRTC session. In response to receiving an accept message, the first endpoint computing device 404 may establish a WebRTC session with the second endpoint computing device 405 to exchange content, such as media between the endpoint computing devices 404, 405.

In some implementations, the first endpoint computing device 404 and/or the second endpoint computing device 405 may send other messages to one another via the SWAP server 403. As one example, a close message may be sent via the SWAP server 403 to close the connection and/or terminate the WebRTC session. The close message may be a protocol message with a message field indicated as "close". As another example, an application message may be sent via the SWAP server 403 that may be an application specific message defined by the application and/or the application provider. The application message may be a protocol message with a message field indicated as "application". As another example, an updated message may be sent via the SWAP server 403 that may be a request from one endpoint to another endpoint to update the WebRTC session. The update message may be a protocol message with a message field indicated as "update".

Figure 5:
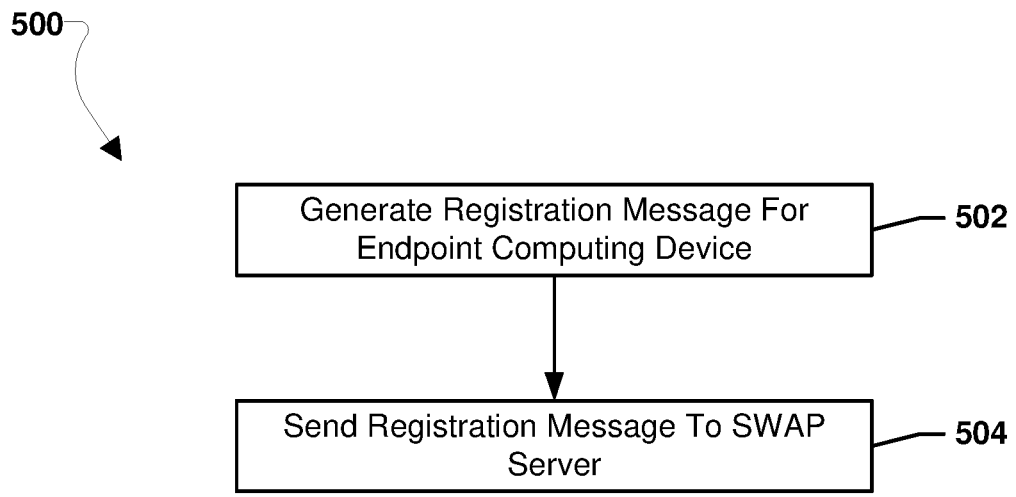
FIG. 5 is process flow diagram illustrating a method for registering an endpoint computing device in accordance with various embodiments.

FIG. 5 shows a process flow diagram of an example method 500 for registering an endpoint computing device in accordance with various embodiments. With reference to FIGS. 1A-5, means for performing operations of the method 500 may include a processing system as described herein. A processing system may include one or more processors (such as 210, 212, 214, 216, 218, 252, 260) of a UE (such as the UE 120, 120a-120e, 200, 320, 404, 405) or a network computing device (such as the server 143, 146, 350, 402, 404, 405). Further, one or more processors within a processing system may be configured with software or firmware to perform various operations of the method. To encompass any of the processor(s), hardware elements and software elements that may be involved in performing the method 500, the elements performing method operations are referred to generally as a "processing system." In various embodiments, the operations of method 500 may be performed by a processing system of an endpoint computing device registering itself with a SWAP server (such as the SWAP server 145, 403). In various embodiments, the operations of method 500 may be performed by a processing system of an application provider (such as the application provider server 146, 402) registering an endpoint with a SWAP server (such as the SWAP server 145, 403).

In block 502, the processing system may perform operations to generate a registration message for an endpoint computing device. The registration message may register an endpoint computing device with a SWAP server. The registration message may include matching criteria as matching parameters. Matching criteria may be received on a per computing device basis and may be unique matching criteria for a given computing device. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. When multiple matching criteria are provided, matching criteria rules may be defined that govern how the matching criteria may be combined to verify a match. For example, the rules may be logical operators, such as AND, OR, XOR operators defining how multiple matching criteria may be combined to result in a match. The registration message may identify the endpoint computing device. The registration message may include a shared secret, such as a session token, session key, etc., provided by an application provider server for use in validating that WebRTC session. A registration message may be a protocol message with a message field indicated as "register". Means for performing the operations of block 502 may include a processing system that includes one or more processors of a UE (such as the UE 120, 120a-120e, 200, 320, 404, 405) or a processing system that includes one or more processors of a network computing device (such as the server 143, 146, 350, 402, 404, 405), for example one or more processors 210, 212, 214, 216, 218, 252, 260.

In block 504, the processing system may send the registration to a SWAP server. Successful registration may be indicated by the SWAP server returning an acknowledge message, for example a protocol message with a message field indicated as "ack". An error in registration may be indicated by the SWAP server returning an error message, for example a protocol message with a message field indicated as "error". Means for performing the operations of block 504 may include a processing system that includes one or more processors of a UE (such as the UE 120, 120a-120e, 200, 320, 404, 405) or a processing system that includes one or more processors of a network computing device (such as the server 143, 146, 350, 402, 404, 405), for example one or more processors 210, 212, 214, 216, 218, 252, 260.

Figure 6:
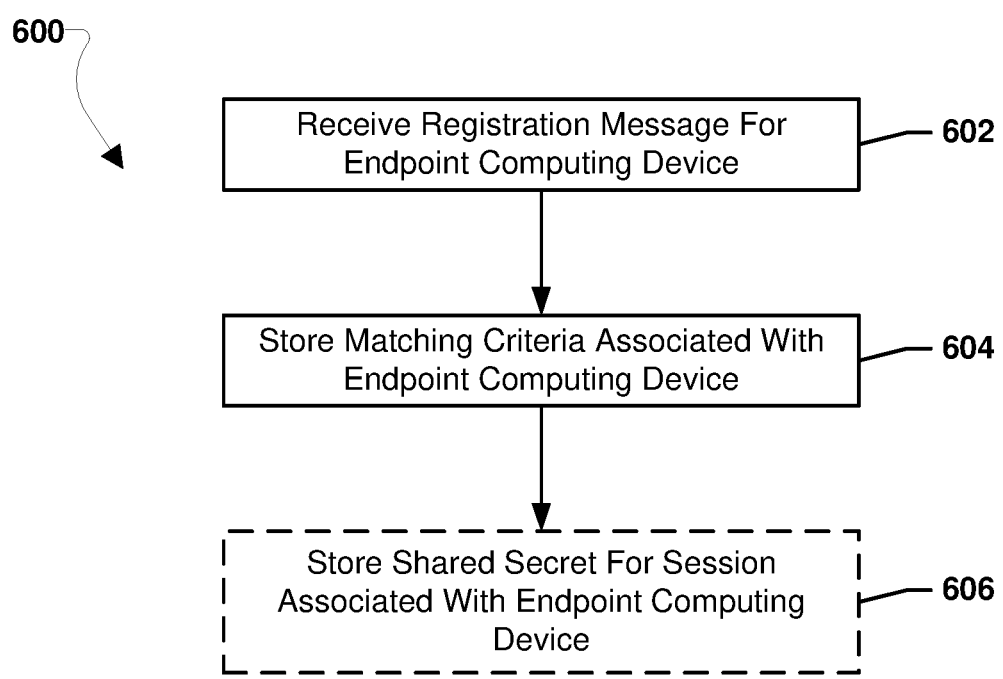
FIG. 6 is process flow diagram illustrating a method for registering an endpoint computing device in accordance with various embodiments.

FIG. 6 is process flow diagram illustrating a method 600 for registering an endpoint computing device in accordance with various embodiments. With reference to FIGS. 1A-6, means for performing operations of the method 600 may include a processing system as described herein. A processing system may include one or more processors (such as 210, 212, 214, 216, 218, 252, 260) of a network computing device (such as the SWAP server 145, 403). Further, one or more processors within a processing system may be configured with software or firmware to perform various operations of the method. To encompass any of the processor(s), hardware elements and software elements that may be involved in performing the method 600, the elements performing method operations are referred to generally as a "processing system." In various embodiments, the operations of method 600 may be performed in conjunction with the operations of method 500 (FIG. 5). With reference to FIGS. 1A-6, means for performing each of the operations of method 600 may be a processing system including one or more processors of a network computing device (such as the SWAP server 145, 403), for example one or more processors 210, 212, 214, 216, 218, 252, 260.

In block 602, the processing system may receive a registration message for an endpoint computing device. The registration message may be received from an endpoint computing device itself or from an application provider server on behalf of an endpoint computing device. The registration message may register an endpoint computing device with a SWAP server. The registration message may include matching criteria as matching parameters. Matching criteria may be received on a per computing device basis and may be unique matching criteria for a given computing device. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens.

When multiple matching criteria are provided, matching criteria rules may be defined that govern how the matching criteria may be combined to verify a match. For example, the rules may be logical operators, such as AND, OR, XOR operators defining how multiple matching criteria may be combined to result in a match. The registration message may identify the endpoint computing device. The registration message may include a shared secret, such as a session token, session key, etc., provided by an application provider server for use in validating that WebRTC session. Means for performing the operations of block 602 may include a processing system including one or more processors of a network computing device (such as the SWAP server 145, 403), for example one or more processors 210, 212, 214, 216, 218, 252, 260.

In block 604, the processing system may store the matching criteria associated with the endpoint computing device. For example, the processing system may store the matching criteria associated with the endpoint computing device in a memory available to the SWAP server. Means for performing the operations of block 604 may include a processing system including one or more processors of a network computing device (such as the SWAP server 145, 403), for example one or more processors 210, 212, 214, 216, 218, 252, 260.

In optional block 606, the processing system may store a shared secret for a session associated with the endpoint computing device. For example, the processing system may store the shared secret for a session associated with the endpoint computing device in a memory available to the SWAP server. The operations of block 606 may be optional, as not all endpoint computing devices may offload message decryption and/or authentication to a SWAP server. Successful registration may be indicated by the SWAP server sending an acknowledge message, for example a protocol message with a message field indicated as "ack", to the computing device originating the received registration message. An error in registration may be indicated by the SWAP server sending an error message, for example a protocol message with a message field indicated as "error", to the computing device originating the received registration message. Means for performing the operations of optional block 606 may include a processing system including one or more processors of a network computing device (such as the SWAP server 145, 403), for example one or more processors 210, 212, 214, 216, 218, 252, 260.

Figure 7:
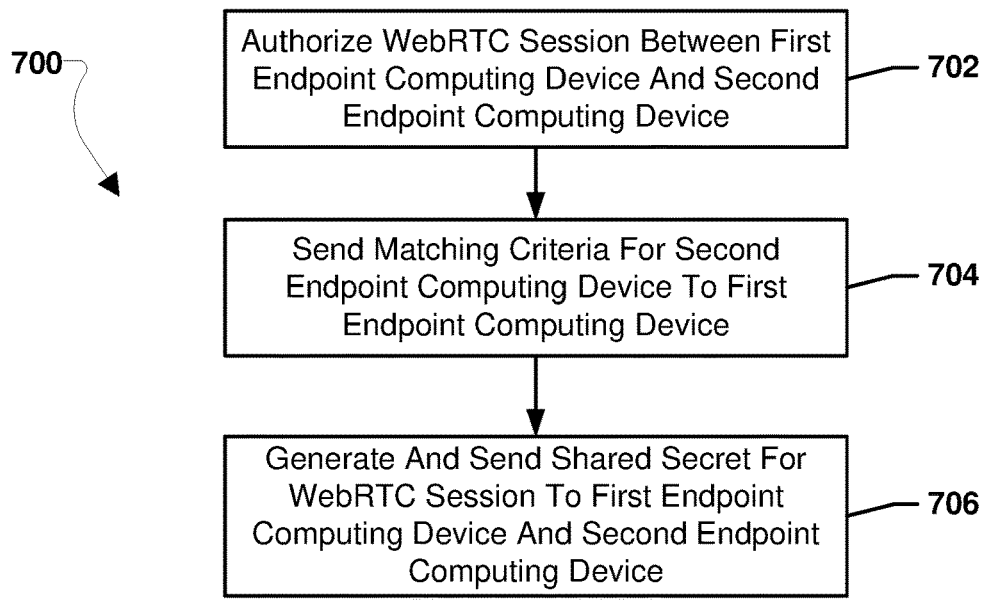
FIG. 7 is a process flow diagram illustrating a method for authorizing a session between a first endpoint computing device and a second endpoint computing device in accordance with various embodiments.

FIG. 7 is a process flow diagram illustrating a method 700 for authorizing a session between a first endpoint computing device and a second endpoint computing device in accordance with various embodiments. With reference to FIGS. 1A-7, means for performing operations of the method 700 may include a processing system as described herein. A processing system may include one or more processors (such as 210, 212, 214, 216, 218, 252, 260) of a network computing device (such as the application provider server 146, 402). Further, one or more processors within a processing system may be configured with software or firmware to perform various operations of the method. To encompass any of the processor(s), hardware elements and software elements that may be involved in performing the method 700, the elements performing method operations are referred to generally as a "processing system." In various embodiments, the operations of method 700 may be performed in conjunction with the operations of methods 500 (FIG. 5) and/or 600 (FIG. 6). With reference to FIGS. 1A-7, means for performing each of the operations of method 700 may be a processing system including one or more processors of a network computing device (such as the application provider server 146, 402), for example one or more processors 210, 212, 214, 216, 218, 252, 260.

In block 702, the processing system may authorize a session between a first endpoint computing device (e.g., a UE 120, 120a-120e, 200, 320, 404, 405, a network computing device 143, 350, 404, 405, etc.) and a second endpoint computing device (e.g., a UE 120, 120a-120e, 200, 320, 404, 405, a network computing device 143, 350, 404, 405, etc.). The session may be a WebRTC session to support exchange of content, such as media, between the endpoint computing devices. Means for performing the operations of optional block 702 may include a processing system including one or more processors of a network computing device (such as the application provider server 146, 402), for example one or more processors 210, 212, 214, 216, 218, 252, 260.

In block 704, the processing system may send matching criteria for the second endpoint computing device to the first endpoint computing device. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. When multiple matching criteria are provided, the indication of the matching criteria may indicate which combinations of the multiple matching criteria are to be provided by the first endpoint computing device to a SWAP server (such as the SWAP server 145, 403) to successfully identify the second endpoint computing device. Means for performing the operations of optional block 704 may include a processing system including one or more processors of a network computing device (such as the application provider server 146, 402), for example one or more processors 210, 212, 214, 216, 218, 252, 260.

In block 706, the processing system may generate and send a shared secret for the session to the first endpoint computing device and the second endpoint computing device. The shared secret may be a shared token, secret key, or other cryptographic element that may enable the first endpoint computing device and the second endpoint computing device to validate messages as originated by one another. Means for performing the operations of optional block 706 may include a processing system including one or more processors of a network computing device (such as the application provider server 146, 402), for example one or more processors 210, 212, 214, 216, 218, 252, 260.

Figure 8:
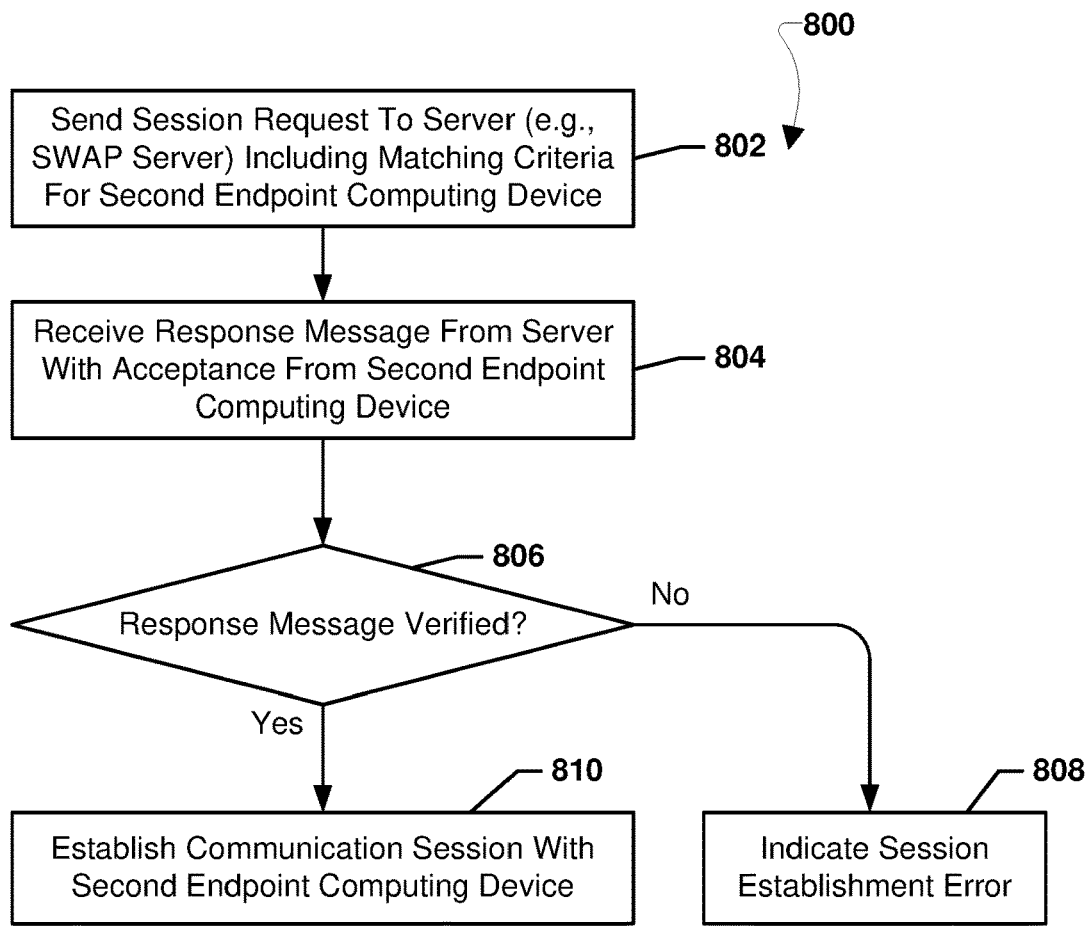
FIG. 8 is a process flow diagram illustrating a method for communication session establishment in accordance with various embodiments.

FIG. 8 shows a process flow diagram of an example method 800 for establishment of a communication session (e.g., a WebRTC session) in accordance with various embodiments. In various embodiments, the operations of method 800 may be performed in conjunction with the operations of methods 500 (FIG. 5), 600 (FIG. 6), and/or 700 (FIG. 7). With reference to FIGS. 1A-8, means for performing operations of the method 800 may include a processing system as described herein. A processing system may include one or more processors (such as 210, 212, 214, 216, 218, 252, 260) of a UE (such as the UE 120, 120a-120e, 200, 320, 404, 405) or a network computing device (such as the server 143, 404, 405). Further, one or more processors within a processing system may be configured with software or firmware to perform various operations of the method. To encompass any of the processor(s), hardware elements and software elements that may be involved in performing the method 800, the elements performing method operations are referred to generally as a "processing system." In various embodiments, the operations of method 800 may be performed by an endpoint computing device (e.g., 120, 120a-120e, 143, 200, 320, 404, 405) attempting to establish a WebRTC session with another endpoint computing device (e.g., 120, 120a-120e, 143, 200, 320, 404, 405).

In block 802, the processing system may send a session request (e.g., a WebRTC session request) to a server (such as a SWAP server 145, 403) including matching criteria for a second endpoint computing device. Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. The matching criteria indicated in the session request (e.g., WebRTC session request) may be the matching criteria of the second endpoint computing device as indicated by an application provider server (such as server 146, 402). The session request (e.g., WebRTC session request) may include a local session description protocol (SDP). The application provider may provide a shared secret, such as a session token, session key, etc., to the endpoint computing devices of the WebRTC session for use in validating the WebRTC session. The session request (e.g., WebRTC session request) may include the shared secret for the session. The session request (e.g., WebRTC session request) may be a protocol message with a message field indicated as "connect". Means for performing the operations of block 802 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

In block 804, the processing system may receive a response message from the server (e.g., SWAP server such as server 146, 402) with an acceptance from the second endpoint computing device. The response message may be an accept message that may be a protocol message with a message field indicated as "accept". The accept message may signal that the second endpoint computing device has accepted the session request (e.g., WebRTC session request). The response message may include the shared secret for the session and/or be encrypted with a shared secret key between the first endpoint computing device and the second endpoint computing device. The response message may include a SDP answer and/or a remote SDP for the communication session (e.g., WebRTC session). Means for performing the operations of block 804 may include a processing system including one or more processors of a UE (such as the UE 120, 120a-120e, 200, 320, 404, 405) or one or more processors of a network computing device (such as the server 143, 404, 405), for example one or more processors 210, 212, 214, 216, 218, 252, 260.

In determination block 806, the processing system may perform operations to determine whether the response message is verified. Determining whether the response message is verified may include determining whether the response message may be decrypted and/or may pass an integrity/authenticity check. Successful decryption and/or passing of an integrity/authenticity check may indicate the second endpoint computing device originated the acceptance. Failure to decrypt or failure of an integrity/authenticity check may indicate the second endpoint computing device did not originate the acceptance. Means for performing the operations of determination block 806 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

In response to determining that the response message is not verified (i.e., determination block 806="No"), the processing system may indicate a session establishment (e.g., WebRTC session establishment) in block 808. Means for performing the operations of block 808 may include a processing system including one or more processors of a UE (such as the UE 120, 120a-120e, 200, 320, 404, 405) or one or more processors of a network computing device (such as the server 143, 404, 405), for example one or more processors 210, 212, 214, 216, 218, 252, 260.

In response to determining that the response message is verified (i.e., determination block 806="Yes"), the processing system may establish the session (e.g., WebRTC session) with the second endpoint computing device in block 810. For example, the processing system may establish a WebRTC connection to the second endpoint computing device according to the remote SDP. Via the established session, content, such as media, may be shared between the first endpoint computing device and the second endpoint computing device. Means for performing the operations of block 810 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

Figure 9:
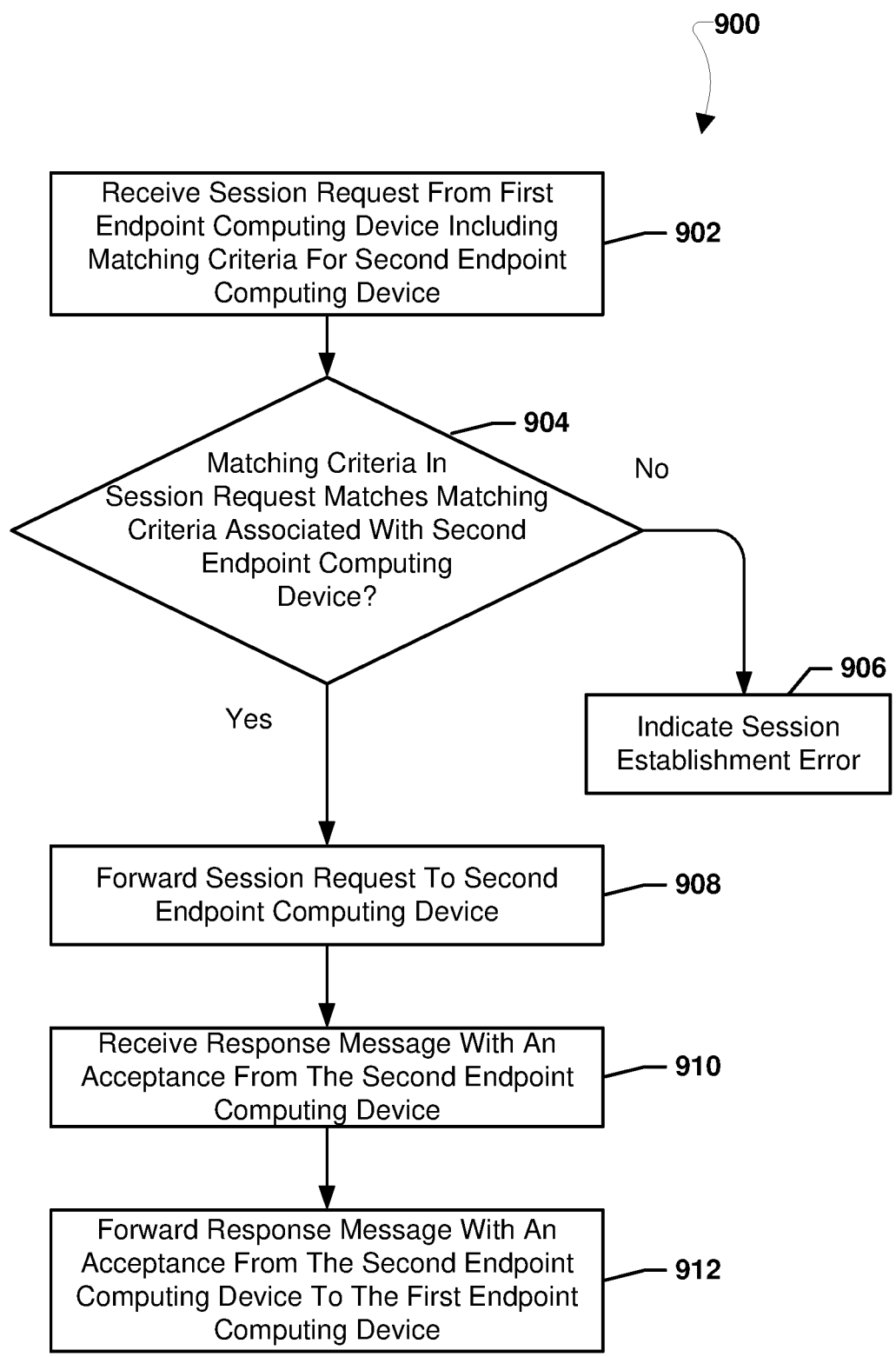
FIG. 9 is a process flow diagram illustrating a method for communication session establishment in accordance with various embodiments.

FIG. 9 is process flow diagram illustrating a method 900 for establishing a communication session (e.g., a WebRTC session) in accordance with various embodiments. With reference to FIGS. 1A-9, means for performing operations of the method 900 may include a processing system as described herein. A processing system may include one or more processors (such as 210, 212, 214, 216, 218, 252, 260) of a network computing device (such as the SWAP server 145, 403). Further, one or more processors within a processing system may be configured with software or firmware to perform various operations of the method. To encompass any of the processor(s), hardware elements and software elements that may be involved in performing the method 900, the elements performing method operations are referred to generally as a "processing system." In various embodiments, the operations of method 900 may be performed in conjunction with the operations of method 500 (FIG. 5), 600 (FIG. 6), 700 (FIG. 7), and/or 800 (FIG. 8). With reference to FIGS. 1A-9, means for performing each of the operations of method 900 may be performed by a processing system including one or more processors of a network computing device (such as the SWAP server 145, 403), for example one or more processors 210, 212, 214, 216, 218, 252, 260.

In block 902, the processing system may receive a session request (e.g., WebRTC session request) from a first endpoint computing device (e.g., 120, 120a-120e, 143, 200, 320, 404, 405) including matching criteria for a second endpoint computing device (e.g., 120, 120a-120e, 143, 200, 320, 404, 405). Examples of matching criteria may include application identifiers, session tokens, endpoint Internet Protocol (IP) addresses, edge application server identifiers (IDs), geographical location indications, resource availability indications, application defined endpoint identifiers and/or addresses, application required capabilities, and/or secure tokens. The matching criteria indicated in the session request (e.g., WebRTC session request) may be the matching criteria of the second endpoint computing device as indicated by an application provider server (such as server 146, 402). The session request (e.g., WebRTC session request) may include a local session description protocol (SDP). The application provider may provide a shared secret, such as a session token, session key, etc., to the endpoint computing devices of the communication session (e.g., WebRTC session) for use in validating the session (e.g., WebRTC session). The session request (e.g., WebRTC session request) may include the shared secret for the session. The session request (e.g., WebRTC session request) may be a protocol message with a message field indicated as "connect". Means for performing the operations of block 902 may include a processing system including one or more processors of a network computing device (such as the SWAP server 145, 403), for example one or more processors 210, 212, 214, 216, 218, 252, 260.

In determination block 904, the processing system may determine whether the matching criteria in the session request (e.g., WebRTC session request) matches matching criteria associated with the second endpoint computing device. In some implementations, the processing system may compare any matching criteria in the session request (e.g., WebRTC session request) received from the first endpoint computing device to matching criteria associated with the second endpoint computing device in response to receiving the session request (e.g., WebRTC session request) from the first endpoint computing device. The matching criteria in the session request (e.g., WebRTC session request) from the first endpoint computing device matching the matching criteria of the second endpoint computing device known to the processor (e.g., stored in a memory available to a SWAP server 145, 403) may indicate the first endpoint computing device supplied valid matching criteria for the second endpoint computing device. The matching criteria in the session request (e.g., WebRTC session request) from the first endpoint computing device not matching the matching criteria of the second endpoint computing device known to the processor (e.g., stored in a memory available to a SWAP server 145, 403) may indicate the WebRTC session request is erroneous and/or malicious. Means for performing the operations of determination block 904 may include a processing system including one or more processors of a network computing device (such as the SWAP server 145, 403), for example one or more processors 210, 212, 214, 216, 218, 252, 260.

In response to determining that the matching criteria in the WebRTC session request does not match the matching criteria associated with the second endpoint computing device (i.e., determination block 904="No"), the processing system may indicate an error (e.g., a WebRTC session establishment error) in block 906. For example, the processing system may indicate a WebRTC session establishment error by sending a rejection message to the first endpoint computing device. As an example, the rejection message may be a protocol message with a message field indicated as "reject". The sending of the rejection message to the first endpoint computing device may prevent the second endpoint computing device from being contacted by the first endpoint computing device and the server (e.g., a SWAP server) when matching fails. This prevention of message forwarding to the second endpoint computing when matching fails may reduce, or prevent, erroneous messages and/or attack attempts on the second endpoint computing device. Means for performing the operations of block 906 may include a processing system including one or more processors of a network computing device (such as the SWAP server 145, 403), for example one or more processors 210, 212, 214, 216, 218, 252, 260.

In response to determining that the matching criteria in the session request (e.g., WebRTC session request) matches the matching criteria associated with the second endpoint computing device (i.e., determination block 904="Yes"), the processing system may forward the session request (e.g., WebRTC session request) to the second endpoint computing device in block 908. The forwarding of the session request (e.g., WebRTC session request) may provide the local SDP to the second endpoint computing device and/or the shared secret, such as a session token, session key, etc., to the second computing device. Means for performing the operations of block 908 may include a processing system including one or more processors of a network computing device (such as the SWAP server 145, 403), for example one or more processors 210, 212, 214, 216, 218, 252, 260.

In block 910, the processing system may receive a response message with an acceptance from the second endpoint computing device. The response message may be an accept message that may be a protocol message with a message field indicated as "accept". The accept message may signal that the second endpoint computing device has accepted the session request (e.g., WebRTC session request). The response message may include the shared secret for the session and/or be encrypted with a shared secret key between the first endpoint computing device and the second endpoint computing device. The response message may include an SDP answer and/or a remote SDP for the communication session (e.g., WebRTC session). Means for performing the operations of block 910 may include a processing system including one or more processors of a network computing device (such as the SWAP server 145, 403), for example one or more processors 210, 212, 214, 216, 218, 252, 260.

In block 912, the processing system may forward the response message with an acceptance from the second endpoint computing device to the first endpoint computing device. Means for performing the operations of block 912 may include a processing system including one or more processors of a network computing device (such as the SWAP server 145, 403), for example one or more processors 210, 212, 214, 216, 218, 252, 260.

Figure 10:
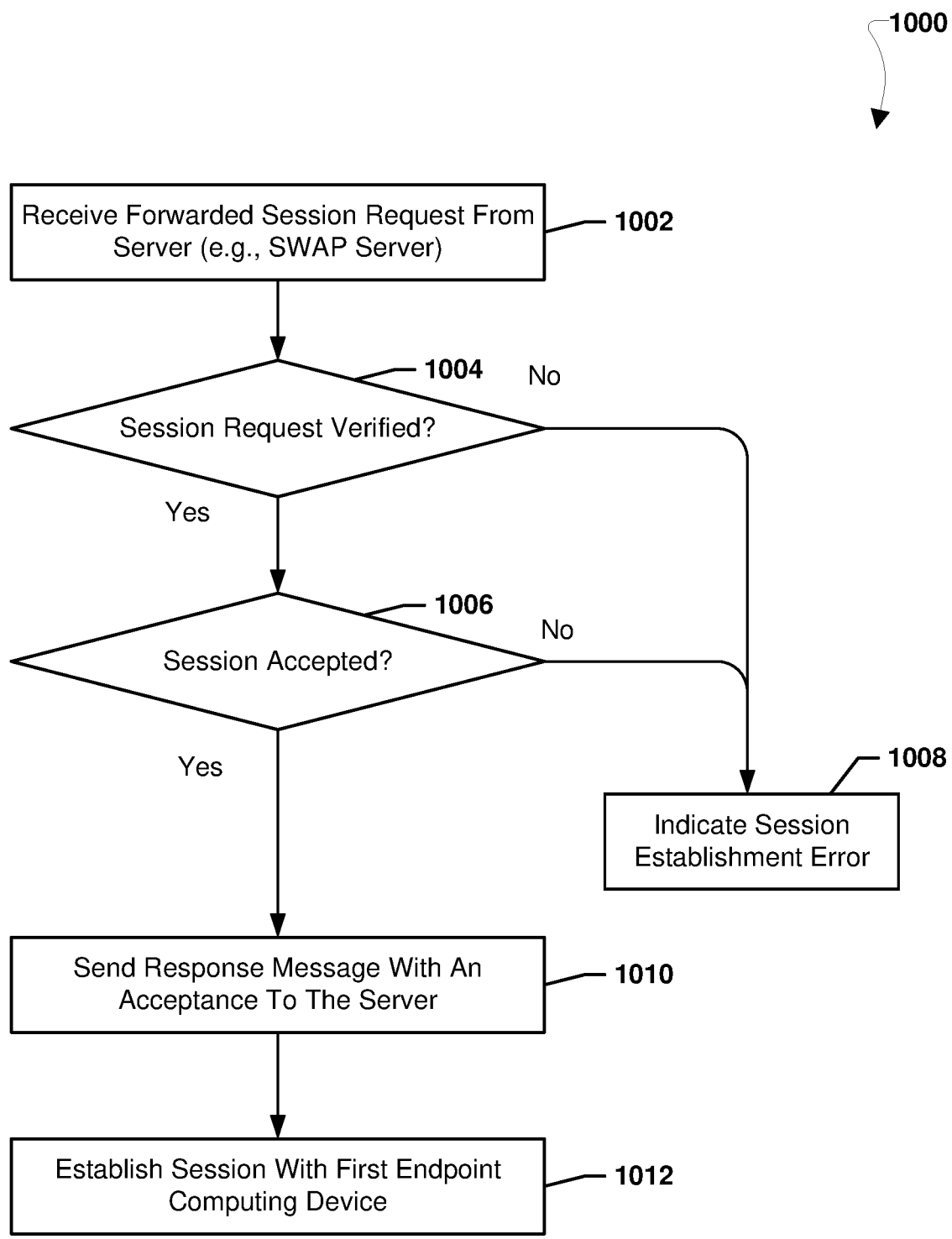
FIG. 10 is a process flow diagram illustrating a method for communication session establishment in accordance with various embodiments.

FIG. 10 shows a process flow diagram of an example method 1000 for WebRTC session establishment in accordance with various embodiments. In various embodiments, the operations of method 1000 may be performed in conjunction with the operations of methods 500 (FIG. 5), 600 (FIG. 6), 700 (FIG. 7), 800 (FIG. 8), and/or 900 (FIG. 9). With reference to FIGS. 1A-10, means for performing operations of the method 1000 may include a processing system as described herein. A processing system may include one or more processors (such as 210, 212, 214, 216, 218, 252, 260) of a UE (such as the UE 120, 120a-120e, 200, 320, 404, 405) or a network computing device (such as the server 143, 404, 405). Further, one or more processors within a processing system may be configured with software or firmware to perform various operations of the method. To encompass any of the processor(s), hardware elements and software elements that may be involved in performing the method 1000, the elements performing method operations are referred to generally as a "processing system." In various embodiments, the operations of method 1000 may be performed by an endpoint computing device (e.g., 120, 120a-120e, 143, 200, 320, 404, 405) receiving a request to establish a WebRTC session from another endpoint computing device (e.g., 120, 120a-120e, 143, 200, 320, 404, 405).

In block 1002, the processing system may receive a forwarded session request (e.g., WebRTC session request) from server (e.g., a SWAP server 145, 403). The forwarded session request (e.g., WebRTC session request) may be a session request from a first endpoint computing device (e.g., 120, 120a-120e, 143, 200, 320, 404, 405) including matching criteria for a second endpoint computing device (e.g., 120, 120a-120e, 143, 200, 320, 404, 405) forwarded from a server (e.g., a SWAP server). The session request (e.g., WebRTC session request) may include a local session description protocol (SDP). The application provider may provide a shared secret, such as a session token, session key, etc., to the endpoint computing devices of the communication session (e.g., WebRTC session) for use in validating the session (e.g., WebRTC session). The session request (e.g., WebRTC session request) may include the shared secret for the session. The session request (e.g., WebRTC session request) may be a protocol message with a message field indicated as "connect". Means for performing the operations of block 1002 may include a processing system including one or more processors of a UE (such as the UE 120, 120a-120e, 200, 320, 404, 405) or one or more processors of a network computing device (such as the server 143, 404, 405), for example one or more processors 210, 212, 214, 216, 218, 252, 260.

In determination block 1004, the processing system may perform operations to determine whether the session request (e.g., WebRTC session request) is verified. Determining whether the WebRTC session request is verified may include determining whether the session request (e.g., WebRTC session request) may be decrypted and/or may pass an integrity/authenticity check. Successful decryption and/or passing of an integrity/authenticity check may indicate the first endpoint computing device originated the session request (e.g., WebRTC session request) as authorized by an application provider server (e.g., 146, 402). Failure to decrypt or failure of an integrity/authenticity check may indicate the first endpoint computing device did not originate the WebRTC session request. Means for performing the operations of determination block 1004 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

In response to determining that the WebRTC session request is verified (i.e., determination block 1004="Yes"), the processing system may perform operations to determine whether the session (e.g., WebRTC session) is accepted in determination block 1006. For example, the processing system may determine whether an application associated with the session request (e.g., WebRTC session request) is active on the second endpoint computing device and/or whether resources are available to support a session (e.g., WebRTC session). Means for performing the operations of determination block 1006 may include a processing system including one or more processors of a UE (such as the UE 120, 120a-120e, 200, 320, 404, 405) or one or more processors of a network computing device (such as the server 143, 404, 405), for example one or more processors 210, 212, 214, 216, 218, 252, 260.

In response to determining that the session request (e.g., WebRTC session request) is not verified (i.e., determination block 1004="No") or in response to determining that the session (e.g., WebRTC session) is not accepted (i.e., determination block 1006="No"), the processing system may indicate an error (e.g., a WebRTC establishment error) in block 1008. For example, the processing system may indicate a WebRTC session establishment error by sending a rejection message to the SWAP server. As an example, the rejection message may be a protocol message with a message field indicated as "reject". Means for performing the operations of block 1008 may include a processing system including one or more processors of a UE (such as the UE 120, 120a-120e, 200, 320, 404, 405) or one or more processors of a network computing device (such as the server 143, 404, 405), for example one or more processors 210, 212, 214, 216, 218, 252, 260.

In response to determining that the session (e.g., WebRTC session) is accepted (i.e., determination block 1006="Yes"), the processing system may send a response message with an acceptance to the server (e.g., a SWAP server) in block 1010. The response message may be an accept message, which may be a protocol message with a message field indicated as "accept". The accept message may signal that the second endpoint computing device has accepted the session request (e.g., WebRTC session request). The response message may include the shared secret for the session and/or be encrypted with a shared secret key between the first endpoint computing device and the second endpoint computing device. The response message may include a SDP answer and/or a remote SDP for the communication session (e.g., WebRTC session). Means for performing the operations of block 1010 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

In block 1012, the processing system may establish the communication session (e.g., WebRTC session) with the first endpoint computing device. For example, the processing system may establish a WebRTC connection to the first endpoint computing device according to the remote SDP. Via the established communication session, content, such as media, may be shared between the first endpoint computing device and the second endpoint computing device. Means for performing the operations of block 1012 may include a processing system including one or more processors of a UE (such as the UE 120, 120a-120e, 200, 320, 404, 405) or a processing system including one or more processors of a network computing device (such as the server 143, 404, 405), for example one or more processors 210, 212, 214, 216, 218, 252, 260.

Figure 11:
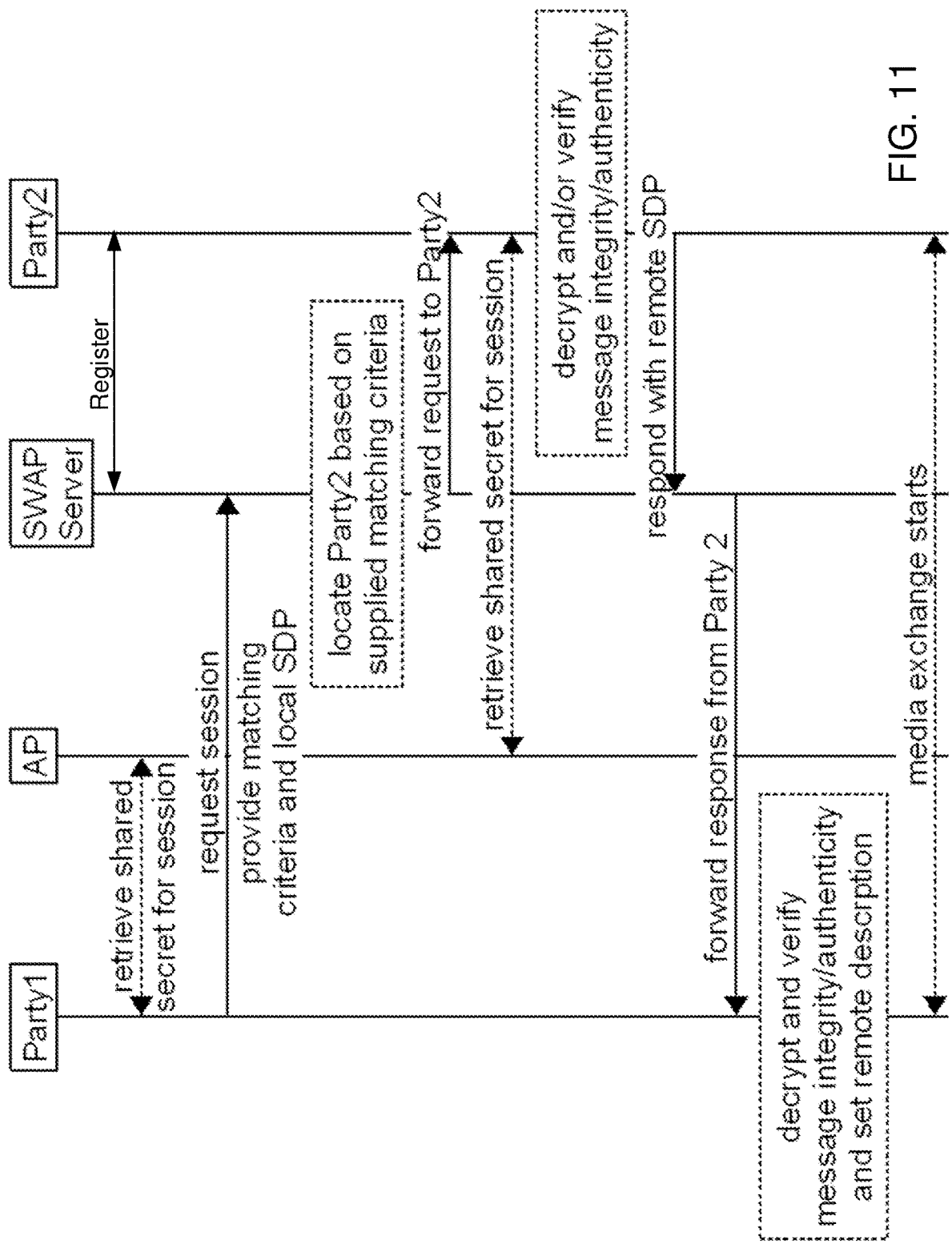
FIG. 11 is a call flow diagram illustrating interactions among example computing devices for communication session establishment in accordance with various embodiments.

FIG. 11 is a call flow diagram illustrating interactions among a first endpoint computing device (e.g., 120, 120a-120e, 143, 200, 320, 404, 405)(labeled Party1 in FIG. 11), an application provider server (e.g., 146, 402)(labeled AP in FIG. 11), a SWAP server (e.g., 145, 403)(labeled SWAP Server in FIG. 11), and a second endpoint computing device (e.g., 120, 120a-120e, 143, 200, 320, 404, 405)(labeled Party1 in FIG. 11) for WebRTC session establishment in accordance with various embodiments. With reference to FIGS. 1A-11, the operations and interactions illustrated in FIG. 11 may be example aspects of an implementation of one or more operations of methods 500 (FIG. 5), 600 (FIG. 6), 700 (FIG. 7), 800 (FIG. 8), 900 (FIG. 9), and/or 1000 (FIG. 10).

As illustrated in FIG. 11, the second endpoint computing device may register with the SWAP server, for example by providing the second endpoint computing device's matching criteria to the SWAP server. The first endpoint computing device may retrieve a shared secret for a session from the application provider server. The first endpoint computing device may send a request for a session providing matching criteria and a local SDP to the SWAP server. The SWAP server may locate the second endpoint computing device based on the supplied matching criteria and forward the request to the second endpoint computing device. The second endpoint computing device may retrieve the shared secret for the session and decrypt and/or verify the message integrity/authenticity. The second endpoint computing device may respond to the SWAP server with a remote SDP. The SWAP server may forward the response from the second endpoint computing device to the first endpoint computing device. The first endpoint computing device may decrypt and/or verify the message integrity/authenticity and set the remote description. The first endpoint computing device and second endpoint computing device may start media exchange in the WebRTC session established between the first endpoint computing device and second endpoint computing device.

Figure 12:
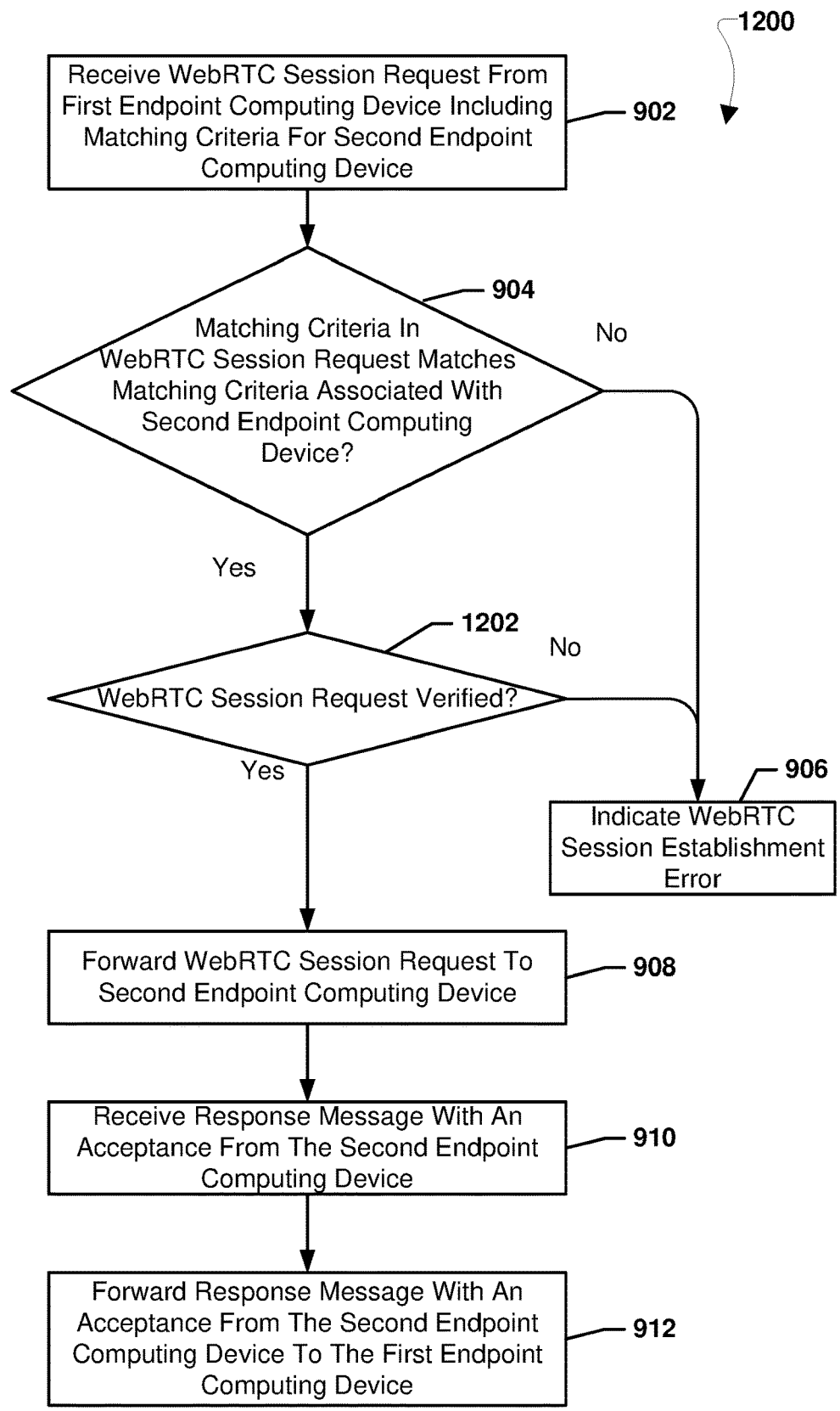
FIG. 12 is a process flow diagram illustrating a method for communication session establishment in accordance with some embodiments.

FIG. 12 is process flow diagram illustrating a method 1200 for WebRTC session establishment in accordance with various embodiments. With reference to FIGS. 1A-12, means for performing operations of the method 1200 may include a processing system as described herein. A processing system may include one or more processors (such as 210, 212, 214, 216, 218, 252, 260) of a network computing device (such as the SWAP server 145, 403). Further, one or more processors within a processing system may be configured with software or firmware to perform various operations of the method. To encompass any of the processor(s), hardware elements and software elements that may be involved in performing the method 1200, the elements performing method operations are referred to generally as a "processing system." In various embodiments, the operations of method 1200 may be performed in conjunction with the operations of method 500 (FIG. 5), 600 (FIG. 6), 700 (FIG. 7), and/or 800 (FIG. 8). With reference to FIGS. 1A-12, means for performing each of the operations of method 1200 may be a processing system including one or more processors of a network computing device (such as the SWAP server 145, 403), for example one or more processors 210, 212, 214, 216, 218, 252, 260. In some implementations, method 1200 may support SWAP server based message decryption and verification of integrity/authenticity when an endpoint computing device has offload decryption and verification of integrity/authenticity as part of a registration process with the SWAP server.

In blocks 902 and 904, the processing system may perform operations of like numbered blocks of method 900 (FIG. 9) to receive a WebRTC session request from a first endpoint computing device (e.g., 120, 120a-120e, 143, 200, 320, 404, 405) including matching criteria for a second endpoint computing device (e.g., 120, 120a-120e, 143, 200, 320, 404, 405 and to determine whether the matching criteria in the WebRTC session request matches matching criteria associated with the second endpoint computing device.

In response to determining that the matching criteria in the WebRTC session request matches the matching criteria associated with the second endpoint computing device (i.e., determination block 904="Yes"), the processing system may perform operations to determine whether the WebRTC session request is verified in determination block 1202. Determining whether the WebRTC session request is verified may include determining whether the WebRTC session request may be decrypted and/or may pass an integrity/authenticity check. Successful decryption and/or passing of an integrity/authenticity check may indicate the first endpoint computing device originated the WebRTC session request as authorized by an application provider server (e.g., 146, 402). Failure to decrypt or failure of an integrity/authenticity check may indicate the first endpoint computing device did not originate the WebRTC session request. Means for performing the operations of determination block 1202 may include a processing system including one or more processors of a network computing device (such as the SWAP server 145, 403), for example one or more processors 210, 212, 214, 216, 218, 252, 260.

In response to determining that the matching criteria in the WebRTC session request does not match the matching criteria associated with the second endpoint computing device (i.e., determination block 904="No") or in response to determining that the WebRTC session request is not verified (i.e., determination block 1202="No"), the processing system may indicate a WebRTC session establishment error in block 906 and in blocks 908, 910, and 912 perform operations of like numbered blocks of method 900 (FIG. 9) to forward the WebRTC session request, receive a response message, and forward the response message.

Figure 13:
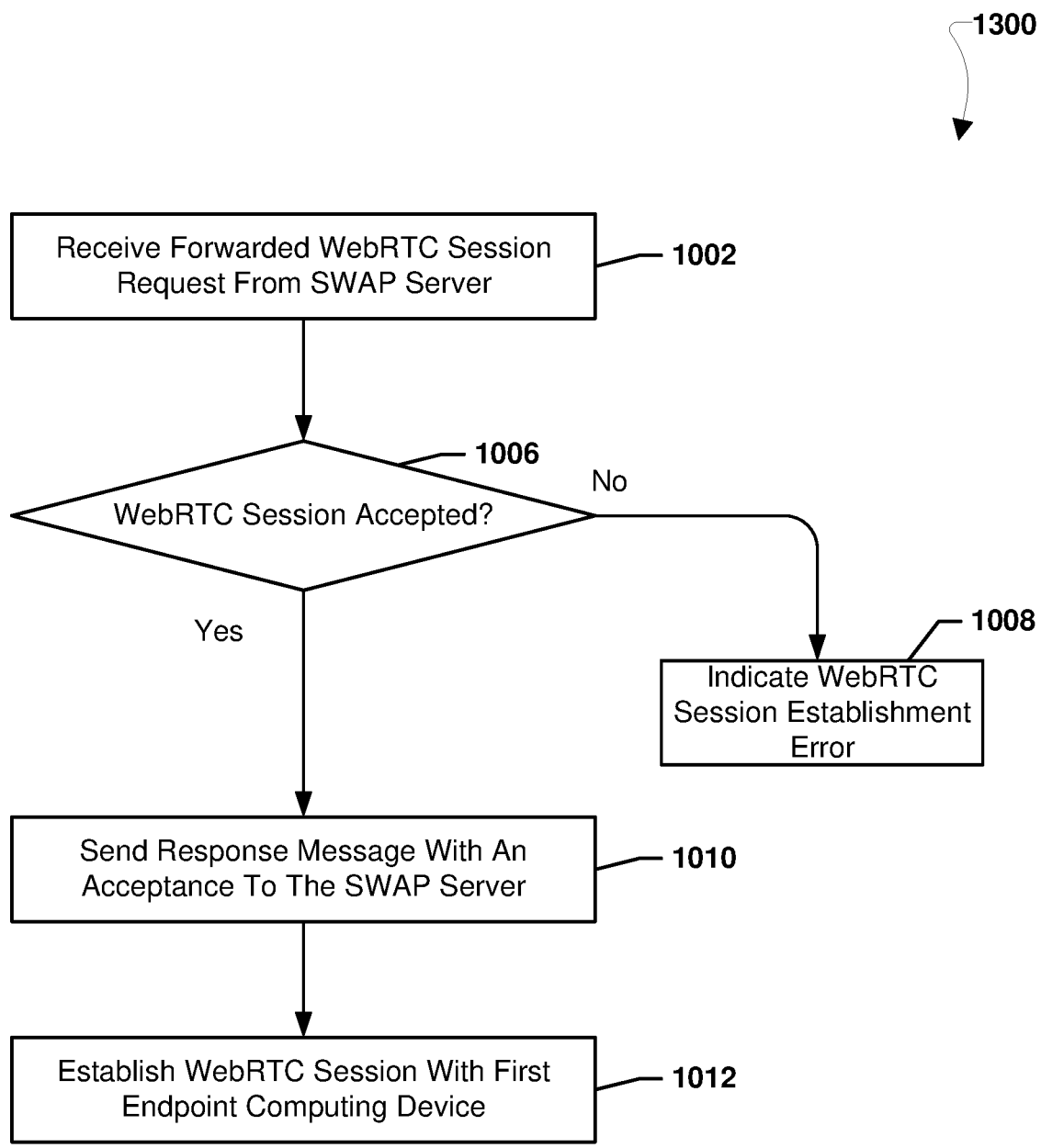
FIG. 13 is a process flow diagram illustrating a method for communication session establishment in accordance with various embodiments.

FIG. 13 shows a process flow diagram of an example method 1300 for WebRTC session establishment in accordance with various embodiments. In various embodiments, the operations of method 1300 may be performed in conjunction with the operations of methods 500 (FIG. 5), 600 (FIG. 6), 700 (FIG. 7), 800 (FIG. 8), and/or 1200 (FIG. 12). With reference to FIGS. 1A-13, means for performing operations of the method 1300 may include a processing system as described herein. A processing system may include one or more processors (such as 210, 212, 214, 216, 218, 252, 260) of a UE (such as the UE 120, 120a-120e, 200, 320, 404, 405) or a network computing device (such as the server 143, 404, 405). Further, one or more processors within a processing system may be configured with software or firmware to perform various operations of the method. To encompass any of the processor(s), hardware elements and software elements that may be involved in performing the method 1300, the elements performing method operations are referred to generally as a "processing system." In various embodiments, the operations of method 1300 may be performed by an endpoint computing device (e.g., 120, 120a-120e, 143, 200, 320, 404, 405) receiving a request to establish a WebRTC session from another endpoint computing device (e.g., 120, 120a-120e, 143, 200, 320, 404, 405). In some implementations, method 1300 may support SWAP server based message decryption and verification of integrity/authenticity when an endpoint computing device has offload decryption and verification of integrity/authenticity as part of a registration process with the SWAP server.

In block 1002, the processing system may receive a forwarded WebRTC session request from a SWAP server (e.g., server 145, 403) as discussed with reference to like numbered block of method 1000 (FIG. 10). The forwarded WebRTC session request may be a WebRTC session request forwarded by the SWAP server after successful decryption and/or passing of an integrity/authenticity check of the WebRTC session request at the SWAP server.

In blocks 1006, 1008, 1010, and 1012, the processing system may perform operations as discussed with reference to like numbered blocks of method 1000 (FIG. 10).

Figure 14:
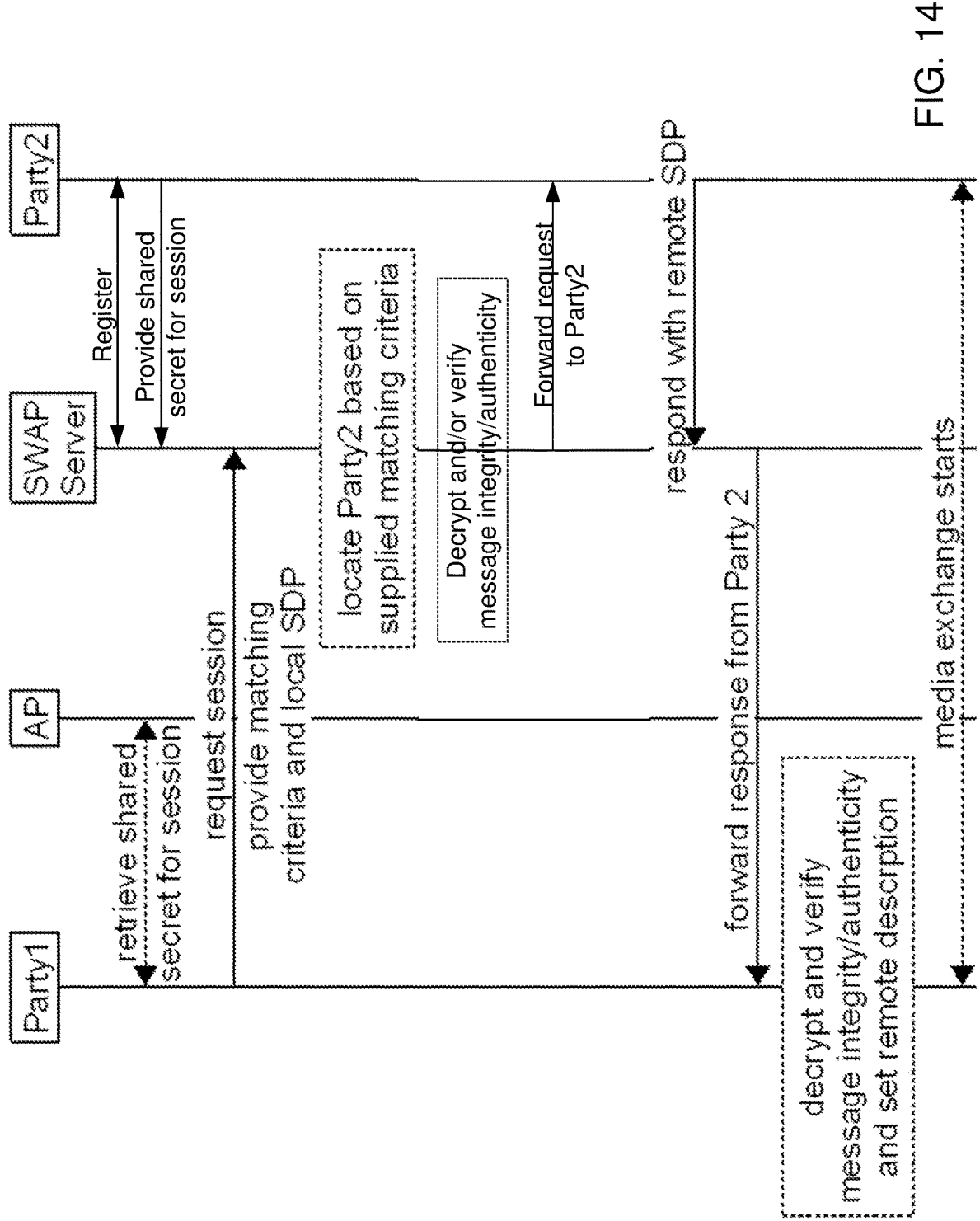
FIG. 14 is a call flow diagram illustrating interactions among example computing devices for communication session establishment in accordance with some embodiments.

FIG. 14 is a call flow diagram illustrating interactions among a first endpoint computing device (e.g., 120, 120a-120e, 143, 200, 320, 404, 405)(labeled Party1 in FIG. 11), an application provider server (e.g., 146, 402)(labeled AP in FIG. 11), a SWAP server (e.g., 145, 403)(labeled SWAP Server in FIG. 11), and a second endpoint computing device (e.g., 120, 120a-120e, 143, 200, 320, 404, 405)(labeled Party1 in FIG. 11) for WebRTC session establishment in accordance with various embodiments. With reference to FIGS. 1A-14, the operations and interactions illustrated in FIG. 14 may be example aspects of an implementation of one or more operations of methods 500 (FIG. 5), 600 (FIG. 6), 700 (FIG. 7), 800 (FIG. 8), 1200 (FIG. 12), and/or 1300 (FIG. 13).

As illustrated in FIG. 14, the second endpoint computing device may register with the SWAP server, for example by providing the second endpoint computing device's matching criteria to the SWAP server. The second endpoint computing device may provide the shared secret for the session to the SWAP server. The provisioning of the shared secret for the session to the SWAP server may enable SWAP server based message decryption and verification of integrity/authenticity and offloading of decryption and verification of integrity/authenticity by the second endpoint computing device to the SWAP server. The first endpoint computing device may retrieve a shared secret for a session from the application provider server. The first endpoint computing device may send a request for a session providing matching criteria and a local SDP to the SWAP server. The SWAP server may locate the second endpoint computing device based on the supplied matching criteria. The SWAP server may decrypt and/or verify the message integrity/authenticity. The SWAP server may forward the request to the second endpoint computing device. The second endpoint computing device may respond to the SWAP server with a remote SDP. The SWAP server may forward the response from the second endpoint computing device to the first endpoint computing device. The first endpoint computing device may decrypt and/or verify the message integrity/authenticity and set the remote description. The first endpoint computing device and second endpoint computing device may start media exchange in the WebRTC session established between the first endpoint computing device and second endpoint computing device.

Figure 15:
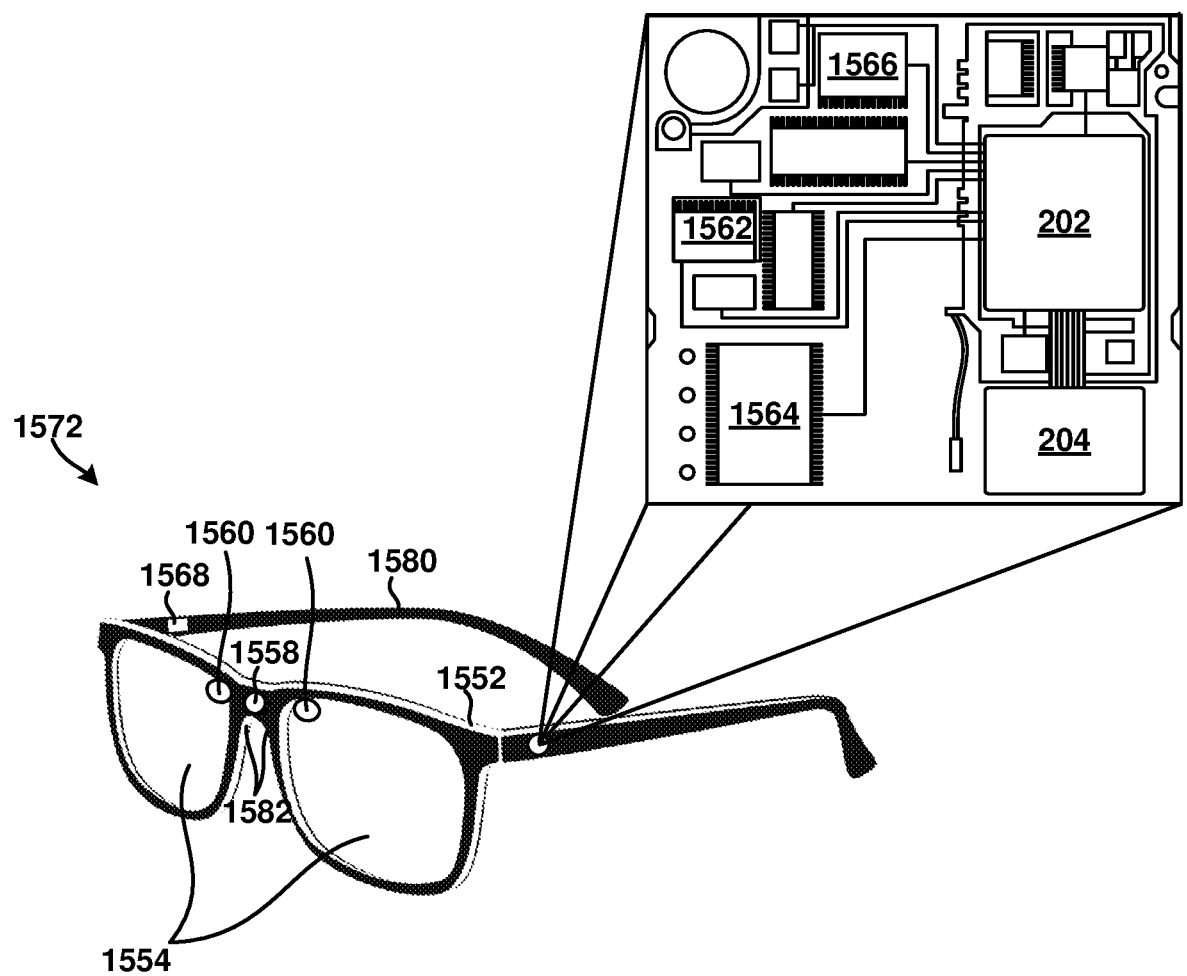
FIG. 15 is an illustration of a head-mounted device (e.g., augmented reality glasses) that may implement various embodiments.

Various embodiments may be implemented on a variety of wireless network devices, an example of which is illustrated in FIG. 15 in the form of a head-mounted device 1572. With reference to FIGS. 1A-15, the head-mounted device 1572 may be a specific implementation of a user equipment computing device (e.g., UE 120, 120a-e, 200, 320, 405, 406). The head-mounted device 172 includes a frame 1552, two optical lenses 1554, and a first SOC 202 (e.g., a SOC-CPU) coupled to a second SOC 204 (e.g., a 5G capable SOC) that is communicatively coupled to outward facing world-view image sensors/cameras 1558, inward facing gaze-view sensors/cameras 1560, a sensor array 1562, a memory 1564, and communication circuitry 1566. In various embodiments, the communication circuitry 1566 may support one or more RATs to support communications among various devices. In some embodiments, the head-mounted device 1572 may include capacitance touch sensing circuits along the arms 1580 of the frame or in a nose bridge 1582 of the head-mounted device 1572. In some embodiments, the head-mounted device 1572 may also include sensors for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the head-mounted device 1572 and paired or grouped to the head-mounted device 1572 via a wired or wireless connection (e.g., Bluetooth®, etc.).

In some embodiments, the SOC 202, 204 may also be communicatively coupled to an image rendering device 1568 (e.g., an image projector), which may be embedded in arm portions 1580 of the frame 1552 and configured to project images onto the optical lenses 1554. In some embodiments, the image rendering device 1568 may include a light-emitting diode (LED) module, a light tunnel, a homogenizing lens, an optical display, a fold mirror, or other components well known projectors or head-mounted displays. In some embodiments (e.g., those in which the image rendering device 1568 is not included or used), the optical lenses 1554 may be, or may include, see-through or partially see-through electronic displays. In some embodiments, the optical lenses 1554 include image-producing elements, such as see-through Organic Light-Emitting Diode (OLED) display elements or liquid crystal on silicon (LCOS) display elements. In some embodiments, the optical lenses 1554 may include independent left-eye and right-eye display elements. In some embodiments, the optical lenses 1554 may include or operate as a light guide for delivering light from the display elements to the eyes of a wearer.

The outward facing or world-view image sensors/cameras 1558 may be configured to capture real-world images from a user's physical environment, and send the corresponding image data to the SOC 202, 204. The SOC 202, 204 may combine the real-world images with computer-generated imagery or virtual objects (VOs) to generate an augmented scene (or space), and render the augmented scene (or space) on the electronic displays or optical lenses 1554 of the head-mounted device 1572.

The inward facing or gaze-view sensors/cameras 1560 may be configured to acquire image data from the user's eyes or the facial structure surrounding the user's eyes.

Figure 16:
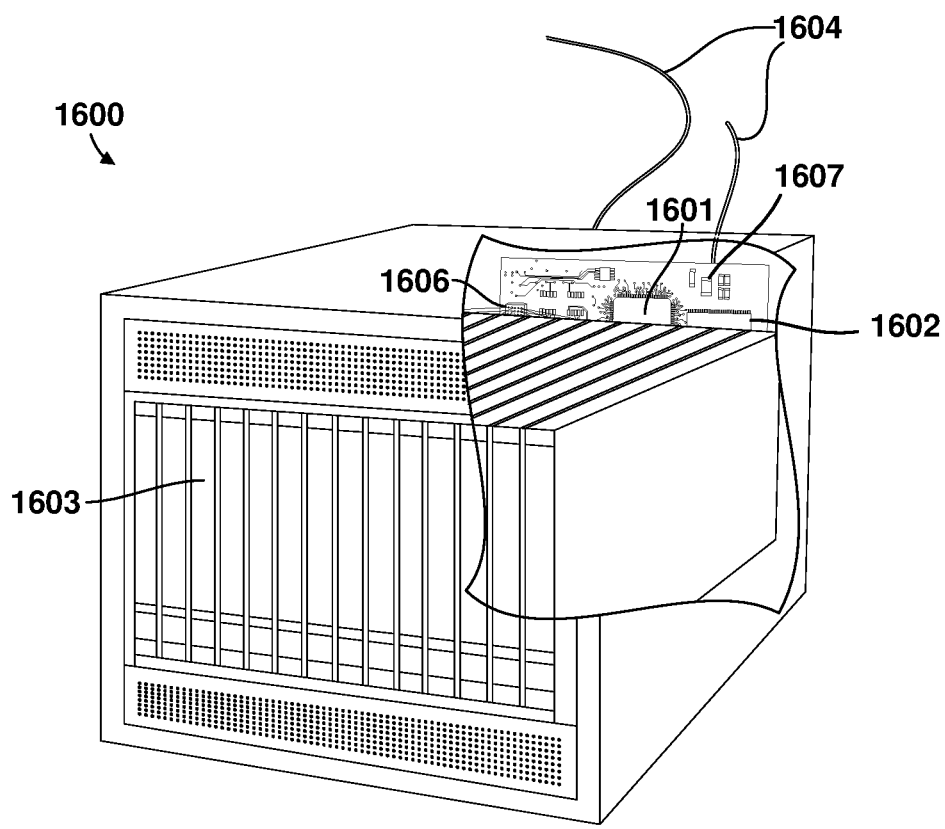
FIG. 16 is a component block diagram of an example server suitable for implementing various embodiments.

Various embodiments may be implemented on a variety of wireless network devices, an example of which is illustrated in FIG. 16 in the form of a wireless network computing device 1600 functioning as a network element of a communication network, such as call server (e.g., server 143, 145, 145, 350, 402, 403, 404, 405). Such network computing devices may include at least the components illustrated in FIG. 16. With reference to FIGS. 1A-16, the network computing device 1600 may typically include a processor 1601 coupled to volatile memory 1602 and a large capacity nonvolatile memory, such as a disk drive 1603. The network computing device 1600 may also include a peripheral memory access device such as a floppy disc drive, compact disc (CD) or digital video disc (DVD) drive 1606 coupled to the processor 1601. The network computing device 1600 may also include network access ports 1604 (or interfaces) coupled to the processor 1601 for establishing data connections with a network, such as the Internet and/or a local area network coupled to other system computers and servers. The network computing device 1600 may include one or more antennas 1607 for sending and receiving electromagnetic radiation that may be connected to a wireless communication link. The network computing device 1600 may include additional access ports, such as USB, Firewire, Thunderbolt, and the like for coupling to peripherals, external memory, or other devices.

Figure 17:
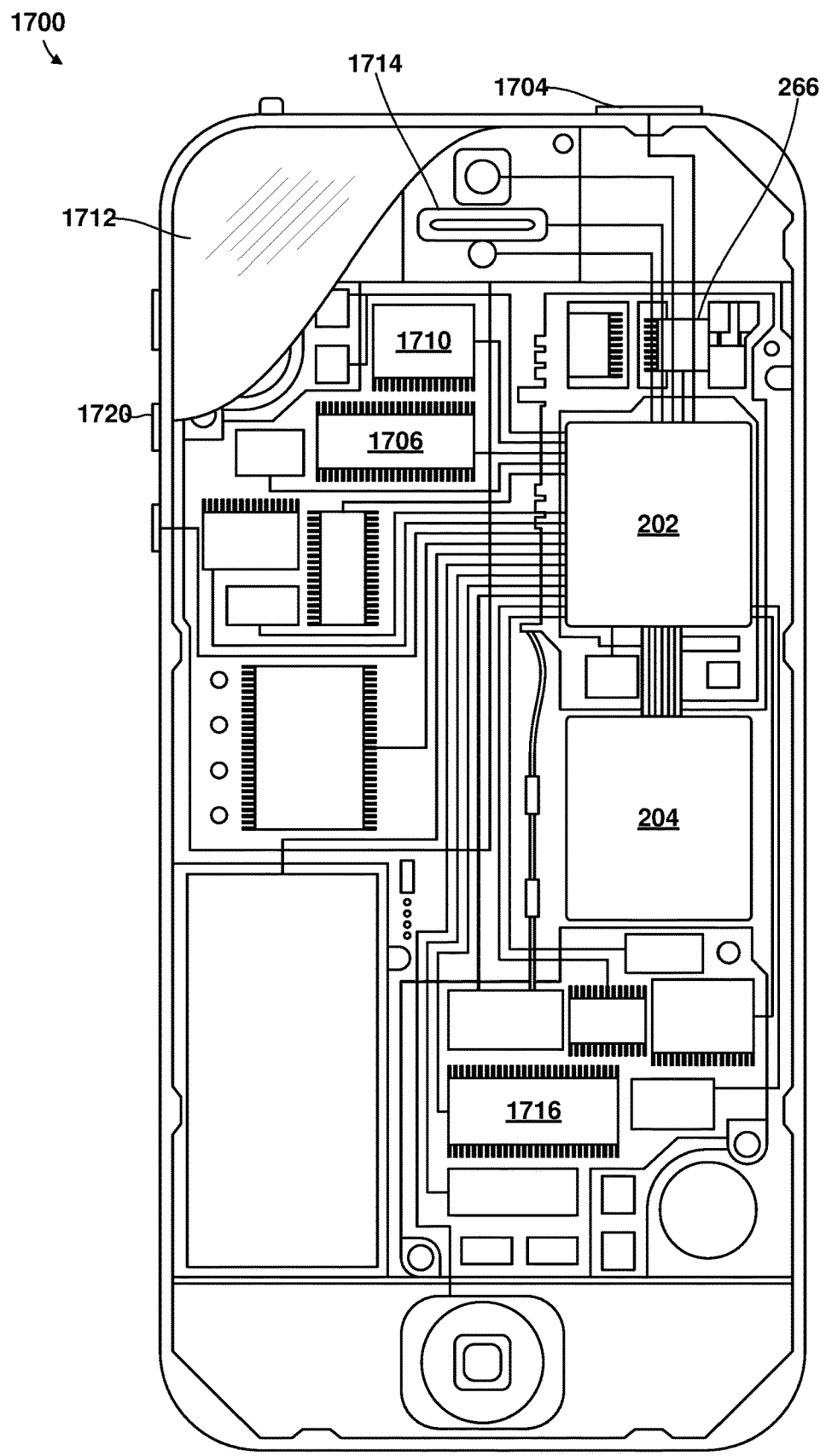
FIG. 17 is a component block diagram of a wireless device suitable for implementing various embodiments.

Various embodiments may be implemented on a variety of wireless devices (e.g., the wireless device 120a-120e, 200, 320, 405, 406), an example of which is illustrated in FIG. 17 in the form of a smartphone 1700. With reference to FIGS. 1A-17, the smartphone 1700 may include a first SOC 202 (e.g., a SOC-CPU) coupled to a second SOC 204 (e.g., a 5G capable SOC). The first and second SOCs 202, 204 may be coupled to internal memory 1706, 1716, a display 1712, and to a speaker 1714. Additionally, the smartphone 1700 may include an antenna 1704 for sending and receiving electromagnetic radiation that may be connected to a wireless data link and/or cellular telephone transceiver 266 coupled to one or more processors in the first and/or second SOCs 202, 204. Smartphones 1700 typically also include menu selection buttons or rocker switches 1720 for receiving user inputs.

A typical smartphone 1700 also includes a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1710 may include a digital signal processor (DSP) circuit (not shown separately).

The processors of the head-mounted device 1572, wireless network computing device 1600, the smart phone 1700 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications may be stored in the memory 1706, 1716 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, 800, 900, 1000, 1200, and/or 1300 may be substituted for or combined with one or more operations of the methods 500, 600, 700, 800, 900, 1000, 1200, and/or 1300.

Implementation examples are described in the following paragraphs. While some of the following implementation examples are described in terms of example methods, further example implementations may include: the example methods discussed in the following paragraphs implemented by a computing device including a processor configured to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method performed by a processor of a server for supporting a communication session establishment, including: receiving a session request from a first endpoint computing device including matching criteria for a second endpoint computing device; determining the matching criteria in the session request matches matching criteria associated with the second endpoint computing device; and forwarding the session request to the second endpoint computing device in response to determining that the matching criteria in the session request matches matching criteria associated with a second endpoint computing device.

Example 2. The method of example 1, further including: receiving a response message with an acceptance from the second endpoint computing device in response to the session request; and forwarding the response message with the acceptance from the second endpoint computing device to the first endpoint computing device.

Example 3. The method of examples 1 or 2, further including, prior to forwarding the session request: determining whether the WebRTC session request is verified in response to determining that the matching criteria in the session request does match matching criteria associated with a second endpoint computing device, in which forwarding the session request to the second endpoint computing device in response to determining that the matching criteria in the session request does match matching criteria associated with a second endpoint computing device includes forwarding the session request to the second endpoint computing device in response to determining that the matching criteria in the session request does match matching criteria associated with a second endpoint computing device and the session request is verified.

Example 4. The method of any of examples 1-3, in which the session request is a Web Real Time Communication (WebRTC) session request; and the server is a Simple WebRTC Application Protocol (SWAP) server.

Example 5. A method performed by a processor of a first endpoint computing device for supporting communication session establishment, including: sending a session request to a server including matching criteria for a second endpoint computing device; receiving a response message from the server with an acceptance from the second endpoint computing device; and establishing a WebRTC session with the second endpoint computing device.

Example 6. The method of example 5, further including: determining whether the response message is verified prior to establishing the session with the second endpoint computing device, in which establishing the WebRTC session with the second endpoint computing device includes establishing the communication session with the second endpoint computing device in response to determining that the response message is verified.

Example 7. The method of examples 5 or 6, further including: receiving the matching criteria for the second endpoint computing device from an application provider server.

Example 8. The method of any of examples 5-7, further including receiving the matching criteria for the second endpoint computing device from an application provider server.

Example 9. The method of any of examples 5-8, in which the communication session is a Web Real Time Communication (WebRTC) session; the session request is a WebRTC session request; and the server is a Simple WebRTC Application Protocol (SWAP) server.

Example 10. The method of any of examples 5-9, in which the first endpoint computing device is a user equipment computing device and the second endpoint computing device is a user equipment device or a server.

Example 11. The method of any of examples 5-9, in which the first endpoint computing device is a server and the second endpoint computing device is a user equipment device or a server.

Example 12. The method of any of examples 5-11, in which the WebRTC session request includes a local session description protocol (SDP) and the response message includes a remote SDP.

Example 13. A method performed by a processor of a receiving endpoint computing device for supporting communication session establishment, including: receiving a session request forwarded from a server, the forwarded session request originated from an originating endpoint computing device; determining whether the session is accepted; sending a response message to the server with an acceptance in response to determining that the session is accepted; and establish a session with the originating endpoint computing device.

Example 14. The method of example 13, further including: determining whether the session request is verified prior to determining whether the session is accepted, in which determining whether the session is accepted includes determining whether the session is accepted in response to determining that the session request is verified.

Example 15. The method of either of examples 13 or 14, in which the communication session is a Web Real Time Communication (WebRTC) session; the session request is a WebRTC session request; and the server is a Simple WebRTC Application Protocol (SWAP) server.

Example 16. The method of any of examples 13-15, in which the originating endpoint computing device is a user equipment computing device and the receiving endpoint computing device is a user equipment device or a server.

Example 17. The method of any of examples 13-15, in which the originating endpoint computing device is a server and the receiving endpoint computing device is a user equipment device or a server.

Example 18. The method of any of examples 13-16, in which the forwarded session request includes a local session description protocol (SDP) and the response message includes a remote SDP.

Example 19. The method of any of examples 5-17, in which determining whether the session request is verified and/or determining whether the response message is verified includes verifying the session request and/or the response message using a shared secret of the session originated from an application provider server.

Example 20. The method of example 19, in which the shared secret is a shared token or shared secret key.

Example 21. The method of any of examples 1-20, in which the matching criteria include one or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A server for supporting session establishment, comprising:
   a memory; and
   a processing system coupled to the memory and including one or more processors configured to cause the server to:
   receive a session request from a first endpoint computing device including multiple matching criteria for a second endpoint computing device;
   determine whether the multiple matching criteria in the session request match known matching criteria associated with the second endpoint computing device, wherein the determination is made based on one or more matching rules that combine the multiple matching criteria to determine a match; and
   forward the session request to the second endpoint computing device in response to determining that the multiple matching criteria in the session request matches known matching criteria associated with a second endpoint computing device.

2. The server of claim 1, wherein the one or more processors are further configured to cause the server to:
   receive a response message with an acceptance from the second endpoint computing device in response to the session request;
   determine an authenticity of the received acceptance; and
   forward the response message with the acceptance from the second endpoint computing device to the first endpoint computing device in response to determining that the received acceptance is authentic.

3. The server of claim 1, wherein the one or more processors are further configured to cause the server to:
   determine whether the session request is verified in response to determining that the multiple matching criteria in the session request does match known matching criteria associated with a second endpoint computing device; and in response to the session request is verified, forward the session request to the second endpoint computing device in response to determining that the multiple matching criteria in the session request does match known matching criteria associated with a second endpoint computing device.

4. The server of claim 1, wherein:

the session request is a Web Real Time Communication (WebRTC) session request; and the server is a Simple WebRTC Application Protocol (SWAP) server.

5. The server of claim 1, wherein the multiple matching criteria include two or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token.

6. A computing device, comprising:

a memory; and a processing system coupled to the memory and including one or more processors configured to cause the computing device to:

send a session request to a server including multiple matching criteria for an endpoint computing device;

receive a session description protocol (SDP) response message from the server with an acceptance from the endpoint computing device; and establish a communication session with the endpoint computing device.

7. The computing device of claim 6, wherein the one or more processors are further configured to cause the computing device to:

determine whether the SDP response message is verified prior to establishing the communication session with the endpoint computing device; and establish the communication session with the endpoint computing device in response to determining that the SDP response message is verified.

8. The computing device of claim 7, wherein the one or more processors are further configured to cause the computing device to determine whether the SDP response message is verified by verifying the response message using a shared secret of the communication session, wherein the shared secret originated from an application provider server.

9. The computing device of claim 8, wherein the shared secret is a shared token or shared secret key.

10. The computing device of claim 6, wherein the one or more processors are further configured to cause the computing device to receive the multiple matching criteria for the endpoint computing device from an application provider server.

11. The computing device of claim 6, wherein:

the communication session is a Web Real Time Communication (WebRTC) session;

the session request is a WebRTC session request; and the server is a Simple WebRTC Application Protocol (SWAP) server.

12. The computing device of claim 6, wherein the computing device is a user equipment computing device and the endpoint computing device is a user equipment device or an edge server.

13. The computing device of claim 6, wherein the computing device is an edge server and the endpoint computing device is a user equipment device or an application server.

14. The computing device of claim 6, wherein the session request includes a local session description protocol (SDP) and the response message includes a remote SDP.

15. The computing device of claim 6, wherein the multiple matching criteria include two or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token.

16. A computing device, comprising:

a memory; and a processing system coupled to the memory and including one or more processors configured to cause the computing device to:

receive a session description protocol (SDP) session request forwarded from a server, the forwarded SDP session request originated from an originating endpoint computing device;

determine whether the forwarded SDP session request is accepted;

send a session description protocol (SDP) response message to the server with an acceptance in response to determining that the session is accepted; and establish a session with the originating endpoint computing device.

17. The computing device of claim 16, wherein the one or more processors are further configured to cause the computing device to:

determine whether the SDP session request is verified prior to determining whether the session is accepted; and in response to determining that the SDP session request is verified, determine whether the session is accepted.

18. The computing device of claim 17, wherein the one or more processors are further configured to cause the computing device to determine whether the SDP session request is verified by the SDP response message using a shared secret of the session, wherein the shared secret originated from an application provider server.

19. The computing device of claim 18, wherein the shared secret is a shared token or shared secret key.

20. The computing device of claim 16, wherein:

the session is a Web Real Time Communication (WebRTC) session;

the session request is a WebRTC session request; and the server is a Simple WebRTC Application Protocol (SWAP) server.

21. The computing device of claim 16, wherein the computing device is a user equipment device or an edge server and the originating endpoint computing device is a user equipment computing device.

22. The computing device of claim 16, the computing device is a user equipment device or an edge server and the originating endpoint computing device is an application server.

23. The computing device of claim 16, wherein the forwarded SDP session request includes a local session description protocol (SDP) and the SDP response message includes a remote SDP.

24. A method performed by a processor of a server for supporting session establishment, comprising:

receiving a session request from a first endpoint computing device including multiple matching criteria for a second endpoint computing device, wherein the multiple matching criteria include two or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token;

determine whether the multiple matching criteria in the session request match known matching criteria associated with the second endpoint computing device, wherein the determination is made based on one or more matching rules that combine the multiple matching criteria to determine a match; and forwarding the session request to the second endpoint computing device in response to determining that the multiple matching criteria in the session request matches known matching criteria associated with a second endpoint computing device.

25. The method of claim 24, further comprising:

receiving a response message with an acceptance from the second endpoint computing device in response to the session request;

determine an authenticity of the received acceptance; and forwarding the response message with the acceptance from the second endpoint computing device to the first endpoint computing device in response to determining the received acceptance is authentic.

26. The method of claim 24, further comprising, prior to forwarding the session request:

determining whether the session request is verified in response to determining that the multiple matching criteria in the session request does match known matching criteria associated with a second endpoint computing device, wherein forwarding the session request to the second endpoint computing device in response to determining that the multiple matching criteria in the session request does match known matching criteria associated with a second endpoint computing device comprises forwarding the session request to the second endpoint computing device in response to determining that the multiple matching criteria in the session request does known match matching criteria associated with the second endpoint computing device and the session request is verified.

27. A method performed by a processor of a first endpoint computing device for supporting communication session establishment, comprising:

sending a session request to a server including multiple matching criteria for a second endpoint computing device, wherein the multiple matching criteria include two or more of an application identifier, a session token, an endpoint Internet Protocol (IP) address, an edge application server identifier (ID), a geographical location indication, a resource availability indication, an application defined endpoint identifier, an application defined endpoint address, an application required capability, or a secure token;

receiving a session description protocol (SDP) response message from the server with an acceptance from the second endpoint computing device; and establishing a communication session with the second endpoint computing device.

28. The method of claim 27, further comprising:

determining whether the SDP response message is verified prior to establishing the communication session with the second endpoint computing device, wherein establishing the communication session with the second endpoint computing device comprises establishing the communication session with the second endpoint computing device in response to determining that the SDP response message is verified.

29. The method of claim 28, wherein determining whether the SDP response message is verified comprises verifying the SDP response message using a shared secret of the session, wherein the shared secret originated from an application provider server.

30. A method performed by a processor of a receiving endpoint computing device for supporting communication session establishment, comprising:

receiving an SDP session request forwarded from a server, the forwarded SDP session request originated from an originating endpoint computing device;

determining whether the session is accepted;

sending an SDP response message to the server with an acceptance in response to determining that the session is accepted; and establish a session with the originating endpoint computing device.

31. The method of claim 30, further comprising:

determining whether the SDP session request is verified prior to determining whether the session is accepted, wherein determining whether the session is accepted comprises determining whether the session is accepted in response to determining that the SDP session request is verified using a shared secret of the session, wherein the shared secret originated from an application provider server.

32. A server for supporting session establishment, comprising:

means for receiving a session request from a first endpoint computing device including multiple matching criteria for a second endpoint computing device;

means for determining whether the multiple matching criteria in the session request match known matching criteria associated with the second endpoint computing device, wherein the determination is made based on one or more matching rules that combine the multiple matching criteria to determine a match; and means for forwarding the session request to the second endpoint computing device in response to determining that the multiple matching criteria in the session request matches known matching criteria associated with a second endpoint computing device.

33. A computing device, comprising:

means for sending an SDP session request to a server including multiple matching criteria for an endpoint computing device;

means for receiving an SDP response message from the server with an acceptance from the endpoint computing device; and means for establishing a communication session with the endpoint computing device.

34. A computing device, comprising:

means for receiving an SDP session request forwarded from a server, the forwarded session request originated from an originating endpoint computing device;

means for determining whether the session is accepted;

means for sending an SDP response message to the server with an acceptance in response to determining that the session is accepted; and means for establishing a session with the originating endpoint computing device.

* * * * *